(12) United States Patent
Mori et al.

(10) Patent No.: US 12,438,422 B2
(45) Date of Patent: Oct. 7, 2025

(54) COIL ALIGNMENT DEVICE AND COIL ALIGNMENT METHOD

(71) Applicant: Mitsubishi Electric Corporation, Tokyo (JP)

(72) Inventors: Akihito Mori, Tokyo (JP); Hiroyuki Yasuda, Tokyo (JP); Kota Hirohashi, Tokyo (JP); Masahiro Yuya, Tokyo (JP); Shunsuke Yamamoto, Tokyo (JP); Kyosuke Yamaguchi, Tokyo (JP); Tetsuya Yokogawa, Tokyo (JP); Katsuya Ito, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 376 days.

(21) Appl. No.: 17/952,799

(22) Filed: Sep. 26, 2022

(65) Prior Publication Data

US 2023/0291291 A1 Sep. 14, 2023

(30) Foreign Application Priority Data

Mar. 9, 2022 (JP) .................................. 2022-035815

(51) Int. Cl.
    *H02K 15/043* (2025.01)
(52) U.S. Cl.
    CPC .................................. *H02K 15/043* (2025.01)
(58) Field of Classification Search
    CPC ............... H02K 15/043; H02K 15/064; H02K 15/0421; H02K 3/28; H02K 3/48; H02K 15/20
    See application file for complete search history.

(56) References Cited

U.S. PATENT DOCUMENTS 7,530,157 B2 * 5/2009 Sawada .............. H02K 15/0428
                                                    29/605
9,917,494 B2 * 3/2018 Yamada ................. H02K 15/04
(Continued)

FOREIGN PATENT DOCUMENTS

EP       3 641 111 A1      4/2020
JP    2003134751 A  *   5/2003
(Continued)

OTHER PUBLICATIONS

Communication dated Feb. 28, 2023, issued in Japanese Application No. 2022-035815.

*Primary Examiner* — Jeffrey T Carley
*Assistant Examiner* — Jose K Abraham
(74) *Attorney, Agent, or Firm* — Sughrue Mion, PLLC

(57) ABSTRACT

A coil alignment device includes: a plate-shaped first jig having a plurality of grooves arranged along a circumferential direction so as to extend toward a radial-direction outer side; and a second jig that can contact with a segment coil inserted in the first jig. Each groove includes a storage portion extending along a radial direction and having a first length so that leg portions of the segment coils can be stored side by side in the radial direction, and a guiding portion extending from the storage portion toward the radial-direction outer side, and has a first shape so that, using, as a fulcrum, one leg portion inserted in the storage portion, the other leg portion is movable toward the storage portion. The second jig is movable to press the segment coil from a radial-direction side and store the other leg portion into the storage portion.

20 Claims, 25 Drawing Sheets

(56) References Cited

U.S. PATENT DOCUMENTS

| | | | |
|---|---|---|---|
| 2015/0207391 A1* | 7/2015 | Yamada | H02K 15/0421 |
| | | | 29/745 |
| 2020/0274426 A1* | 8/2020 | Iwamoto | H02K 15/085 |
| 2020/0313525 A1* | 10/2020 | Falkner | B21D 39/046 |
| 2020/0336054 A1* | 10/2020 | Takeda | H02K 1/165 |
| 2020/0343797 A1 | 10/2020 | Takeda et al. | |
| 2021/0320573 A1* | 10/2021 | Ponzio | H02K 15/064 |

FOREIGN PATENT DOCUMENTS

| | | |
|---|---|---|
| JP | 2013-165540 A | 8/2013 |
| JP | 2020-182339 A | 11/2020 |

* cited by examiner

COIL ALIGNMENT DEVICE AND COIL ALIGNMENT METHOD

BACKGROUND OF THE INVENTION

1. Field of the Invention

The present disclosure relates to a coil alignment device and a coil alignment method.

2. Description of the Background Art

In recent years, rotary electric machines such as a motor provided to electric vehicles have been required to be reduced in size and increased in output. Accordingly, the following technology is used. A conductive wire divided into a set length is deformed into a U shape, to obtain a segment coil. A plurality of the segment coils are attached to a core of a rotary electric machine, and ends of the conductive wires of the segment coils are welded to each other, to form a coil of which the conductive wires more closely contact with each other. Thus, the coil sp-ace factor is improved, whereby size reduction and output increase can be achieved. Here, as a coil alignment device, a coil segment annular alignment device for aligning a plurality of segment coils in an annular shape to form a coil aligned unit at a stage before attachment of the plurality of segment coils to the core of the rotary electric machine is disclosed as follows.

That is, in the conventional coil segment annular alignment device, one end of the coil segment is inserted into a storage hole provided to an alignment annular portion, another end of the coil segment is inserted into an alignment posture conversion groove provided on the inner circumferential side of the alignment annular portion so as to circumferentially extend from the inner circumferential side of the alignment annular portion, and the alignment annular portion is rotated to move the coil segments from an insertion port for inserting the coil segment and change the postures of the coil segments, thus forming a coil assembly. The coil assembly forms two layers which are an inner circumferential layer and an outer circumferential layer when stored in slots of a stator core. Further, a set number of the coil assemblies are overlapped, whereby a coil assembly having a desired number of layers is formed (see, for example, Patent Document 1).

Patent Document 1: Japanese Laid-Open Patent Publication No. 2013-165540

In the conventional coil segment annular alignment device as described above, one end of each coil segment is inserted into the storage hole of the alignment annular portion and fixed, another end thereof is inserted into the alignment posture conversion groove circumferentially extending from the inner circumferential side of the alignment annular portion, and the postures of the coil segments are changed, thereby forming a coil assembly which is a coil aligned unit having two layers which are the inner circumferential layer and the outer circumferential layer.

Here, in the conventional coil segment annular alignment device, in order to form a coil assembly having three or more layers, a set number of the coil assemblies forming two layers need to be overlapped. However, the coil assembly forming the third and fourth layers is placed on the radial-direction outer side of the coil assembly forming the first and second layers, and thus has a diameter different from that of the coil assembly forming the first and second layers. Therefore, in the conventional coil segment annular alignment device, in order to form the coil assembly having the third and fourth layers, an alignment annular portion having a different diameter needs to be prepared separately. Thus, with the conventional coil segment annular alignment device, a coil assembly having three or more layers cannot be formed in the same device using the same jig. Therefore, in order to obtain a coil assembly having three or more layers, it is necessary to prepare another device or an additional mechanism and a dedicated jig. In this case, due to increase in the number of jigs and the number of processing steps, there is a problem of causing increase in equipment cost, increase in device size, and deterioration in production efficiency.

SUMMARY OF THE INVENTION

The present disclosure has been made to solve the above problem, and an object of the present disclosure is to provide a coil alignment device and a coil alignment method that make it possible to form a coil aligned unit having a desired number of layers using the same device while achieving cost reduction, size reduction, and enhancement in production efficiency.

A coil alignment device according to the present disclosure is a coil alignment device for forming an annular coil aligned unit by aligning, in an annular shape, a plurality of segment coils each having a pair of leg portions and a connection portion connecting ends of the pair of leg portions, the coil alignment device including: a plate-shaped first jig having a plurality of grooves into which the leg portions of the segment coils are to be inserted and which are arranged at set intervals along a circumferential direction on a first circle located at a first distance from a first point corresponding to a position of a center point of the coil aligned unit such that each groove extends from the first circle toward a radial-direction outer side; and a second jig capable of contacting with the segment coil inserted in the first jig, from a radial-direction side, by reducing a relative distance to the first jig. Each groove includes a storage portion extending along a radial direction so as to have such a first length L1 that allows a plurality of the leg portions to be stored side by side in the radial direction from the first circle, and a guiding portion further extending from the storage portion toward the radial-direction outer side. Here, among the plurality of grooves arranged along the circumferential direction, the groove into which a first leg portion as one of the leg portions of the segment coil is to be inserted is defined as a first groove, and the groove located toward a first-direction side which is one side in the circumferential direction from the first groove is defined as a second groove. The guiding portion of each groove is formed in such a first shape that, using, as a fulcrum, the first leg portion inserted in the storage portion of the first groove, a second leg portion as another of the leg portions inserted in the guiding portion of the second groove is movable toward the storage portion of the second groove. The second jig is movable so as to press at least one of the second leg portion or the connection portion of the segment coil from the radial-direction outer side, thus causing the second leg portion in the guiding portion of the second groove to be stored into the storage portion of the second groove.

A coil alignment method according to the present disclosure is a coil alignment method using the coil alignment device configured as described above, including: a first insertion step of, in the grooves, inserting one of the leg portions of each segment coil into the storage portion of the corresponding groove, and inserting another of the leg portions into the guiding portion of the corresponding groove different in the circumferential direction; and a first alignment step of, after the first insertion step, while rotating the first jig relative to the second jig toward a second-direction side which is another side in the circumferential direction, pressing at least one of the leg portion or the connection portion of each segment coil from the radial-direction outer side by the second jig, so as to store the other leg portion in each guiding portion into the storage portion sequentially in an order from the segment coil on the first-direction side and bring a plurality of the leg portions into contact with each other in the storage portion of each groove.

The coil alignment device and the coil alignment method according to the present disclosure make it possible to form a coil aligned unit having a desired number of layers using the same device while achieving cost reduction, size reduction, and enhancement in production efficiency.

DETAILED DESCRIPTION OF THE PREFERRED EMBODIMENTS OF THE INVENTION

First Embodiment

Hereinafter, a coil alignment device and a coil alignment method according to the first embodiment of the present disclosure will be described.

The coil alignment device and the coil alignment method of the present embodiment are for forming a coil assembly to be attached to a core of a rotary electric machine such as a motor, the coil assembly being formed by aligning a plurality of segment coils in an annular shape. First, the structure of a stator of the rotary electric machine having the coil assembly will be described with reference to the drawings.

Figure 1:
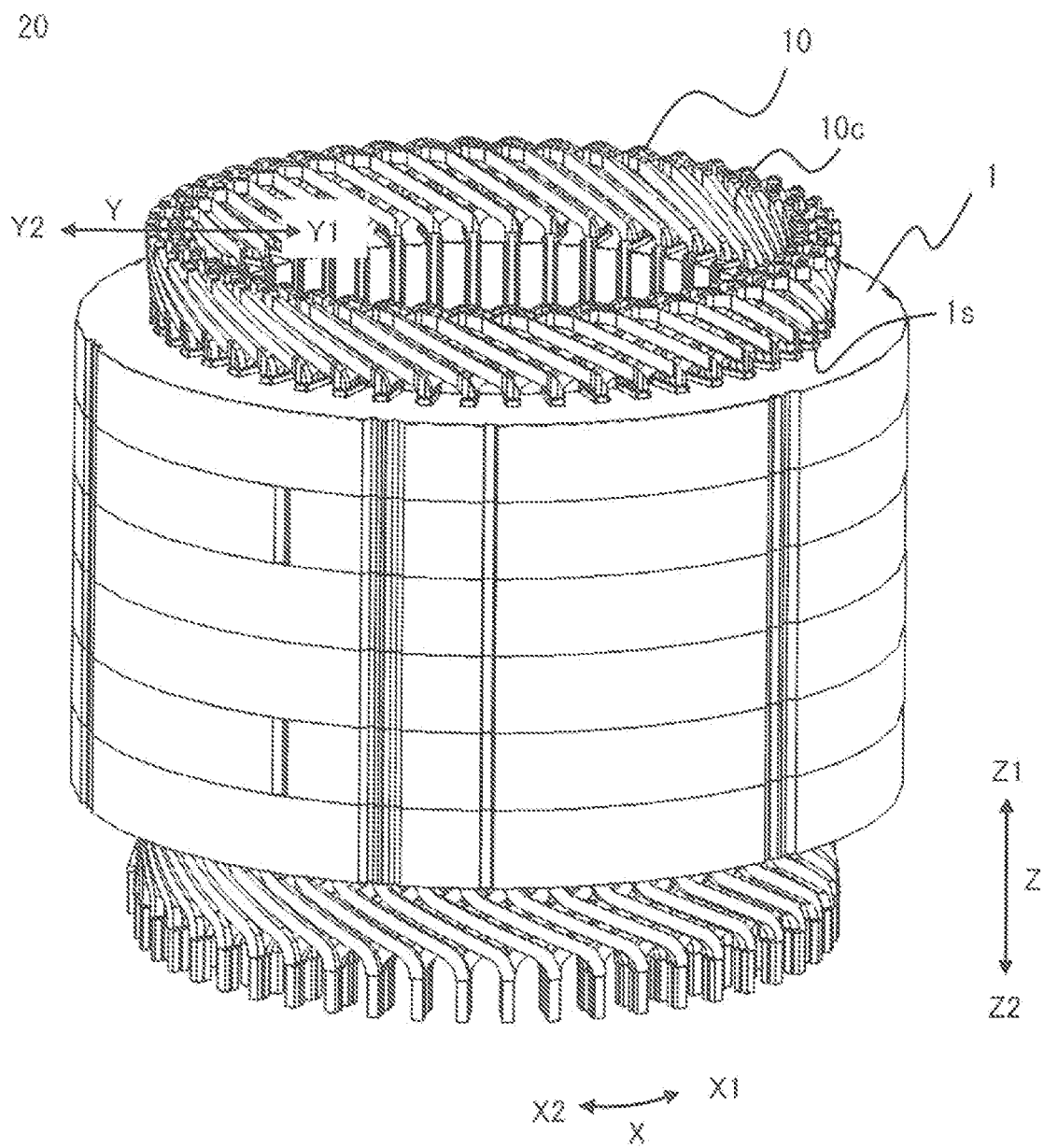
FIG. 1 shows the structure of a stator of a rotary electric machine manufactured using a coil assembly formed by a coil alignment device and a coil alignment method according to the first embodiment of the present disclosure.

Hereinafter, directions about an annular stator 20 shown in FIG. 1 are referred to as a circumferential direction X, a radial direction Y, and an axial direction Z, and these directions are used as references also in the other drawings.

FIG. 1 is a perspective view showing the structure of the stator 20 of the rotary electric machine having a coil assembly 10 formed by the coil alignment device and the coil alignment method according to the first embodiment.

The stator 20 as an armature includes an annular core 1 formed by stacking electromagnetic steel sheets, and the coil assembly 10 as a coil aligned unit mounted to the core 1.

The coil assembly 10 is inserted in slots is formed in the core 1 and opening in a radial-direction inner side Y1, and thus is mounted to the core 1.

Hereinafter, a manufacturing process for the stator 20 will be described.

Figure 2:
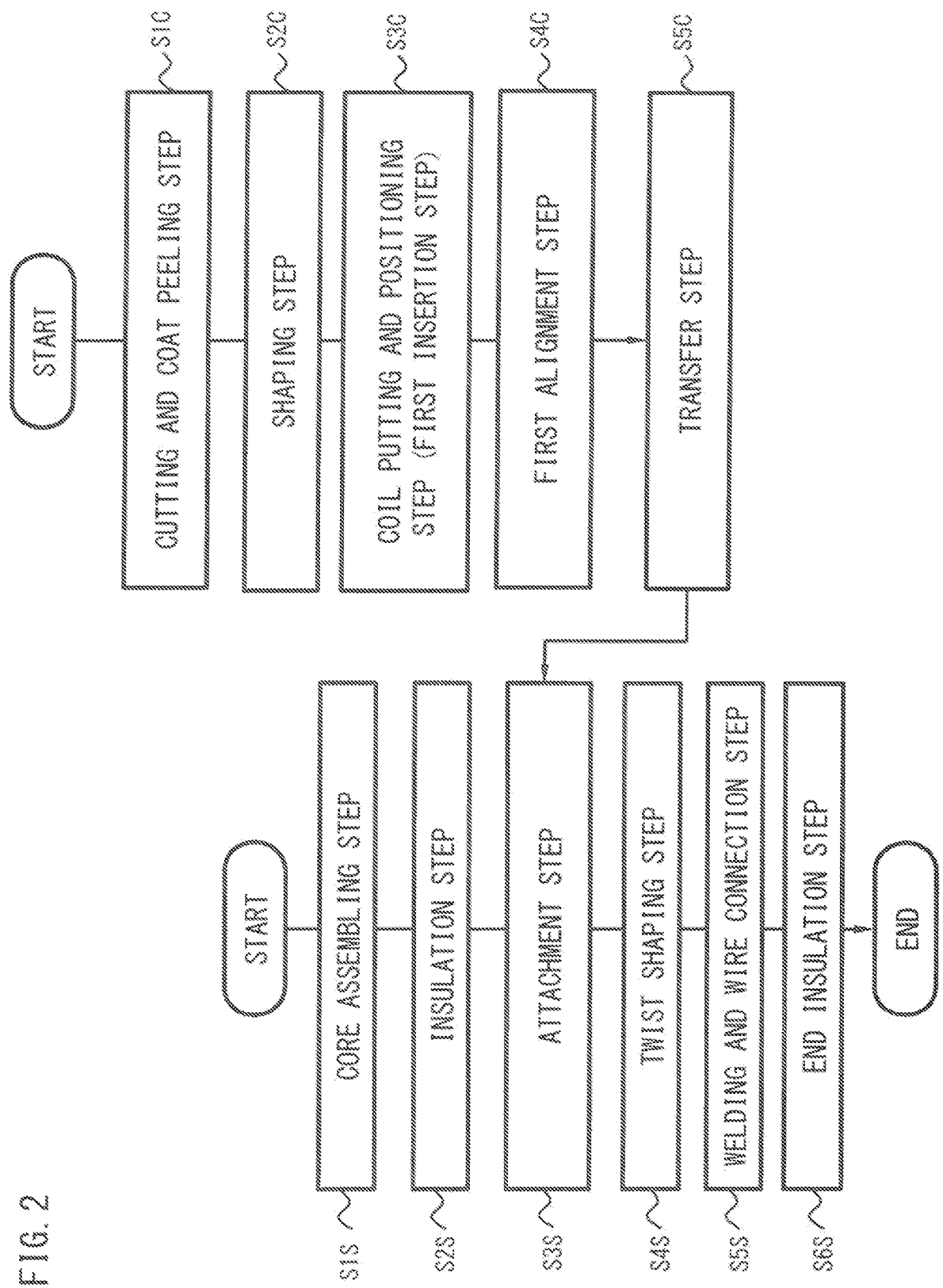
FIG. 2 is a flowchart schematically showing a manufacturing process for a stator of the rotary electric machine according to the first embodiment.

FIG. 2 is a flowchart schematically showing the manufacturing process for the stator 20 of the rotary electric machine shown in FIG. 1.

Figure 3:
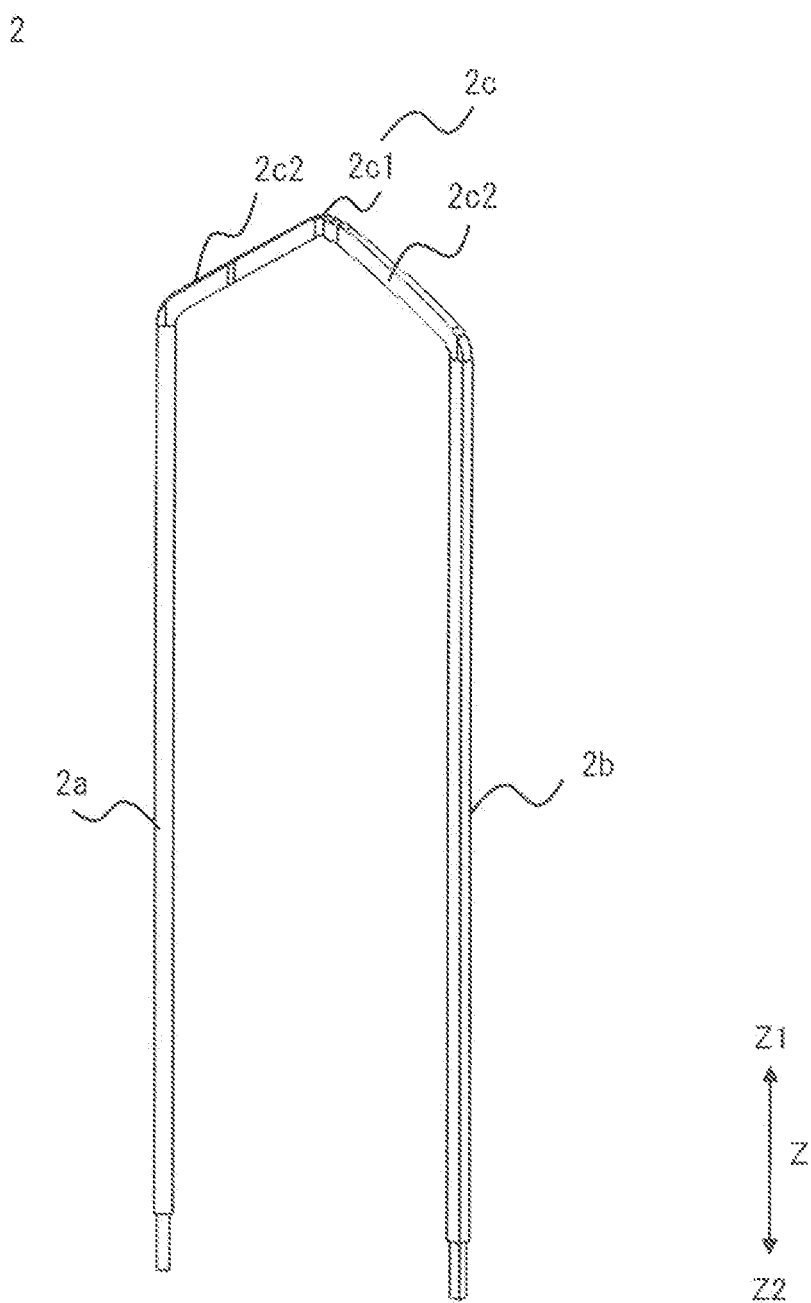
FIG. 3 is a perspective view showing a segment coil composing the coil assembly of the stator according to the first embodiment.

FIG. 3 is a perspective view showing a segment coil 2 composing the coil assembly 10 of the stator 20 shown in FIG. 1.

Figure 4:
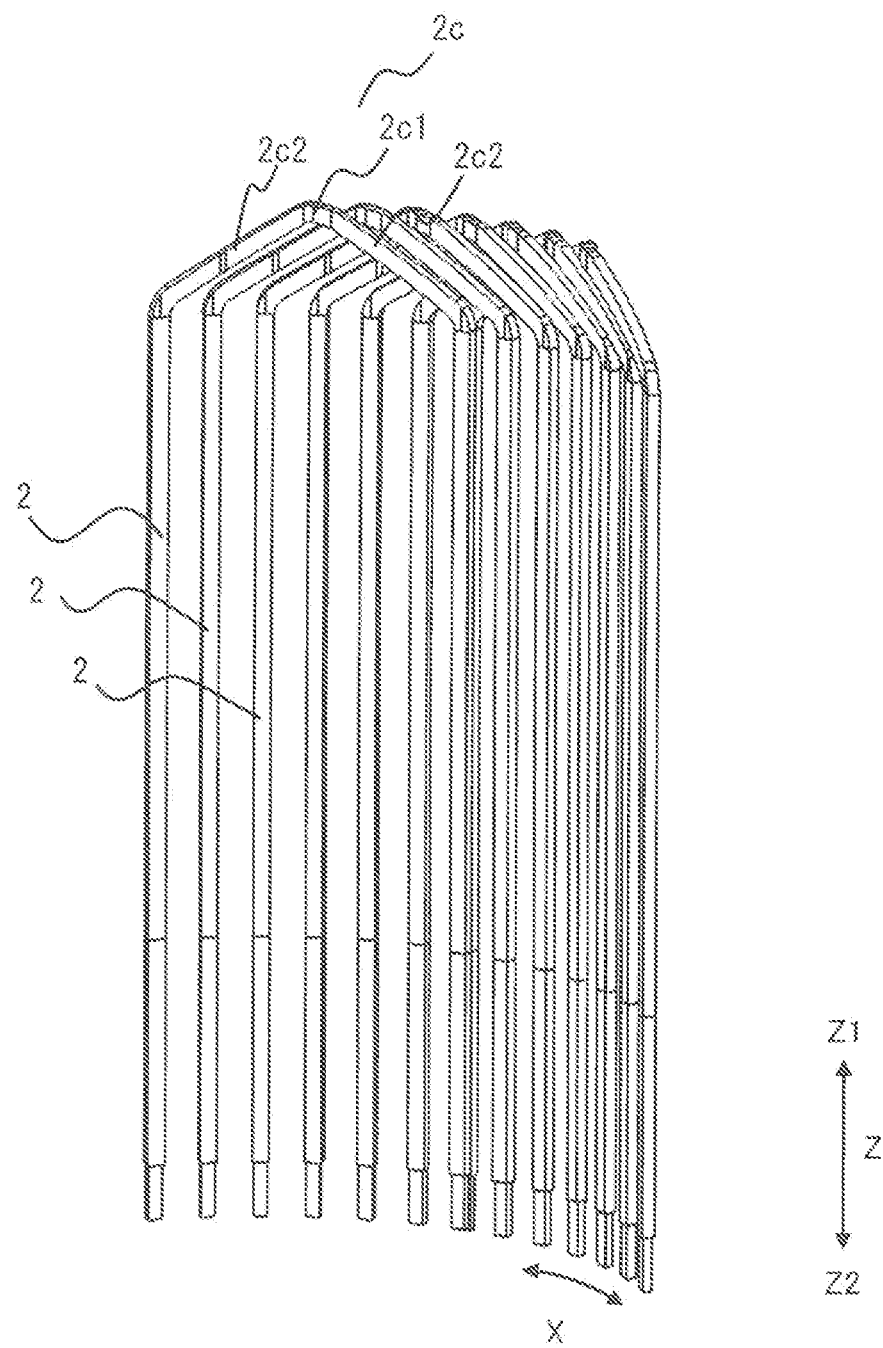
FIG. 4 is a perspective view showing a state in which a plurality of the segment coils are combined in the circumferential direction according to the first embodiment.

FIG. 4 is a perspective view showing a state in which a plurality of the segment coils 2 shown in FIG. 3 are combined in the circumferential direction X.

Figure 5:
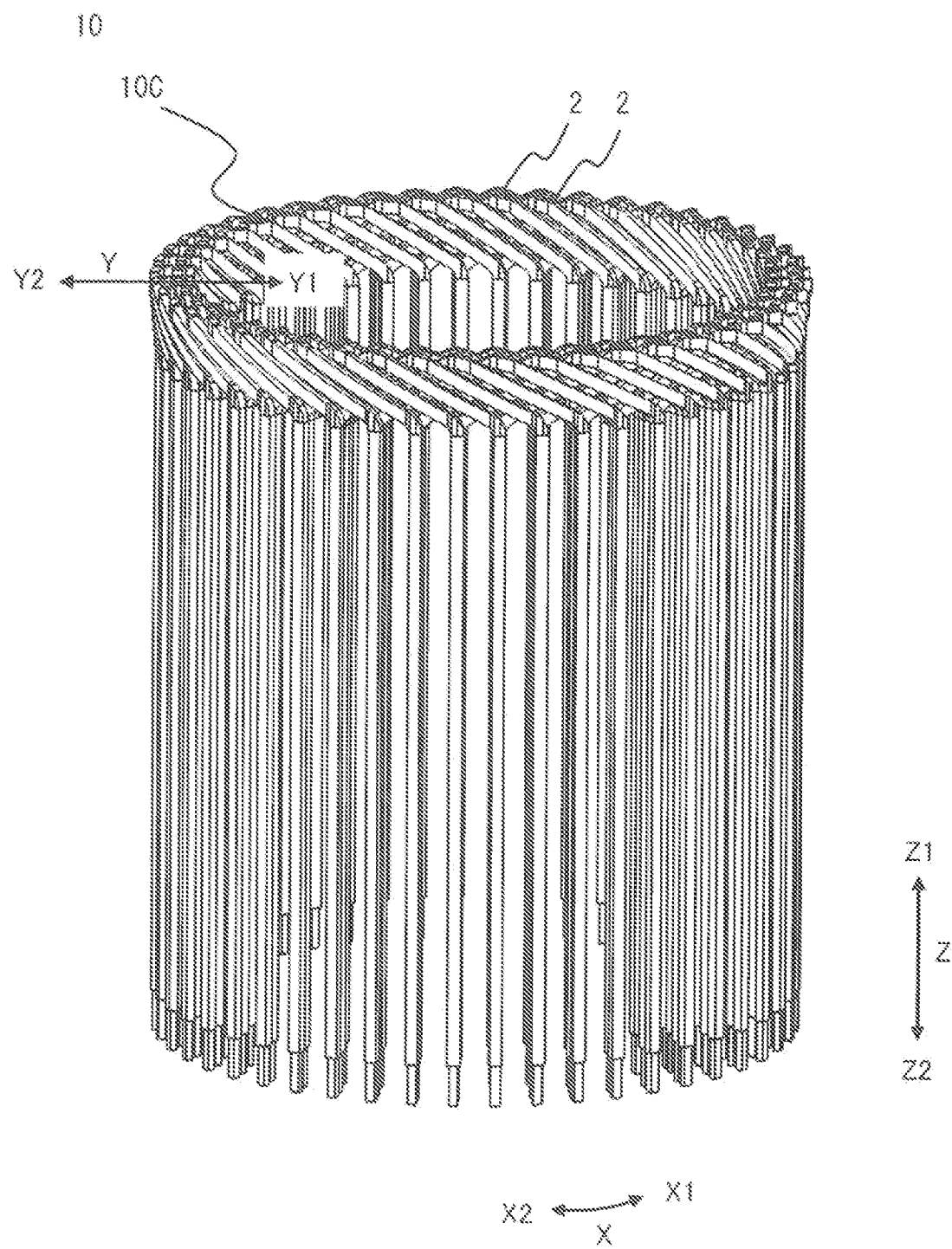
FIG. 5 is a perspective view showing the structure of the coil assembly formed by combining the segment coils according to the first embodiment.

FIG. 5 is a perspective view showing the structure of the coil assembly 10 formed by combining a plurality of the segment coils 2.

Figure 6:
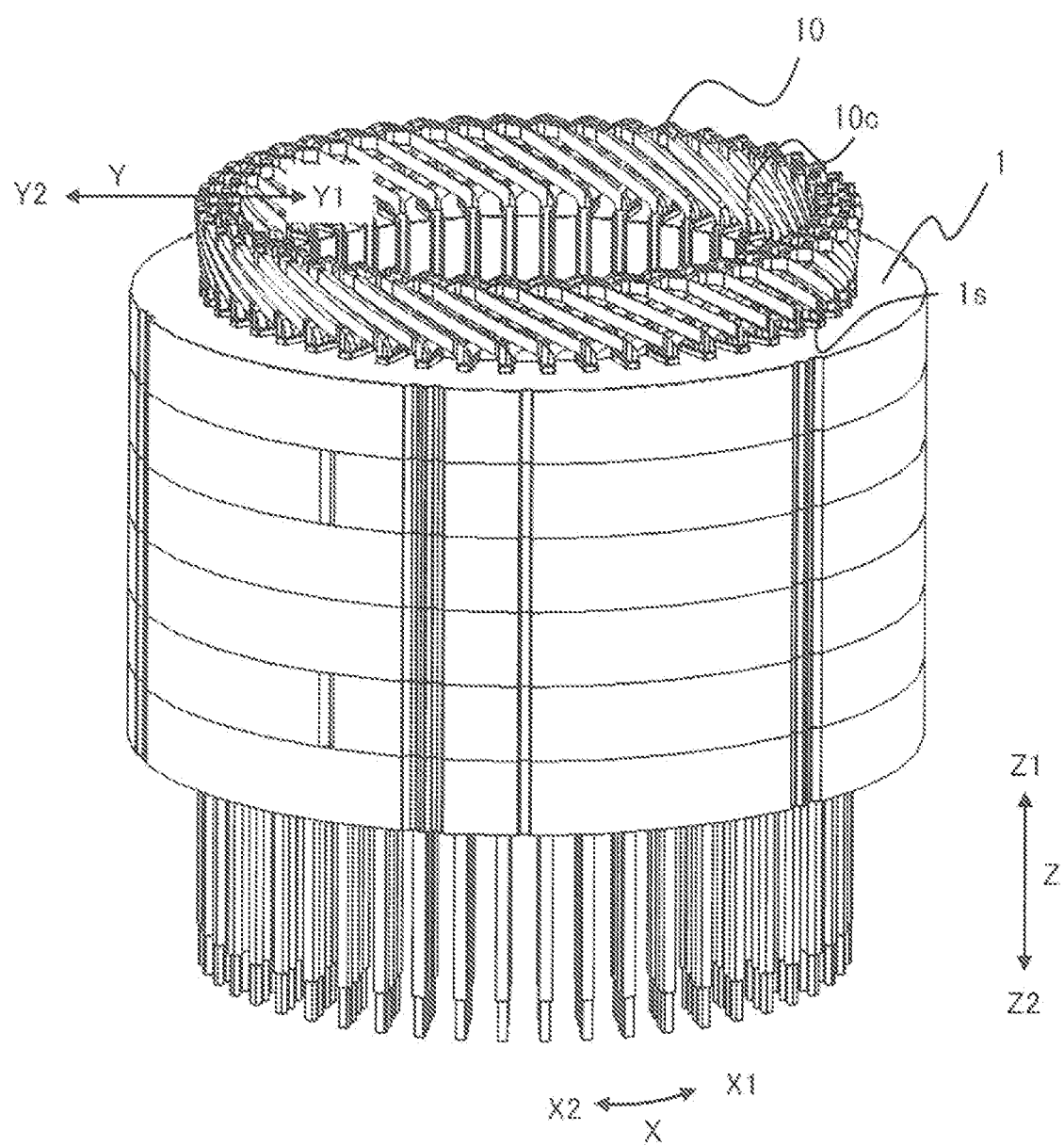
FIG. 6 is a perspective view showing a state in which the coil assembly is inserted in slots of a core of the stator of the rotary electric machine according to the first embodiment.

FIG. 6 is a perspective view showing a state in which the coil assembly 10 shown in FIG. 5 is inserted in the slots is of the core.

The coil assembly 10 as the coil aligned unit is formed by aligning, in an annular shape, a plurality of the segment coils 2 having substantially U shapes as shown in FIG. 3.

The segment coil 2 has a pair of leg portions 2a, 2b extending in the axial direction Z and a connection portion 2c connecting ends in the axial direction Z of the pair of leg portions 2a, 2b, as shown in FIG. 3.

In forming the segment coil 2, first, from a coated rectangular copper wire wound around a coil bobbin, a conductive wire having a set length is cut in a straight shape. Then, the coated parts at both ends of the cut straight-shaped conductive wire are removed at a set dimension by a device such as a peeling die (step S1C, cutting and coat peeling step).

Next, the cut conductive wire is bent by a segment coil shaping die or the like, whereby a mountain-shaped connection portion 2c with a center part of the conductive wire located at the highest in the axial direction Z is formed. Thus, the segment coil 2 having a substantially U shape is formed (step S2C, shaping step).

As shown in FIG. 3, in the mountain-shaped connection portion 2c, parts sloped with respect to an end surface on an axial-direction upper side Z1 of the core 1 of the stator 20 are defined as slope portions 2c2. As described later in detail, the connection portion 2c has, at the top in the axial direction 2, a bent transition portion 2c1 through which the positions of the leg portions 2a, 2b in the slots is are displaced from each other in the radial direction Y.

Next, as shown in FIG. 4, a plurality of the formed segment coils 2 are overlapped at equal pitches in the circumferential direction X, and the segment coils 2 are arranged and positioned so as to be eventually formed in an annular shape (step S3C, coil putting and positioning step (first insertion step)).

The coil putting and positioning step (first insertion step) is performed using the coil alignment device described later, but the coil alignment device is not shown in FIG. 4.

Next, the postures of the arranged segment coils 2 are changed by the coil alignment device, thus forming the coil assembly 10 shown in FIG. 5 (step S4C, first alignment step).

The formed coil assembly 10 has an annular coil cage structure in which a set number of the segment coils 2 are arranged in the circumferential direction X centering on the axis of the stator 20.

Next, the formed coil assembly 10 is transferred to the core 1 (step S5C, transfer step).

Next, a manufacturing process for the core 1, which is performed in parallel with the above steps S1C to S4C for forming the coil assembly 10, will be described.

First, a plurality of core pieces are stamped by a die or the like from an electromagnetic steel sheet having a thin sheet shape, and the core pieces are stacked in the axial direction Z and fixed, thus assembling the core 1 (step S1S, core assembling step).

Next, in each slot is of the core 1 into which the segment coils 2 are to be inserted, insulation paper bent in a set shape so as to match the shape of the slot 1s is mounted. Thus, insulation is ensured between the core 1 and the leg portions 2a, 2b of each segment coil 2 of the coil assembly 10 to be subsequently inserted into the slots 1s (step S2S, core insulation step).

The coil assembly 10 transferred through the above step S5C is attached to the core 1 formed as described above.

First, the coil assembly 10 is moved down toward an axial-direction lower side Z2 to the core 1 so that the leg portions 2a, 2b of the segment coils 2 are inserted into the slots 1s of the core 1 as shown in FIG. 6 (step S3S, attachment step).

Next, ends on the axial-direction lower side Z2 of the leg portions 2a, 2b of the respective segment coils 2 of the coil assembly 10 attached to the core 1 are twisted toward one side in the circumferential direction X by set lengths, respectively. Thus, the ends of the leg portions 2a, 2b of the segment coils 2 can be located at wire-connection positions of the rotary electric machine (step S4S, twist shaping step).

Next, the twisted ends of the leg portions 2a, 2b of the respective segment coils 2 are electrically joined and fixed by tungsten inert gas (TIG) welding, laser welding, or the like, thus making wire connection of the rotary electric machine (step S5S, welding and wire connection step).

Next, the peeled parts at the connected ends of the leg portions 2a, 2b of the segment coils 2 are subjected to insulation processing (step S6S, end insulation step).

Through the above process, the stator 20 with the coil assembly 10 attached to the core 1 as shown in FIG. 1 is formed.

As described above, in manufacturing of the stator 20, the coil assembly 10 is formed by aligning a plurality of segment coils 2 in an annular shape once, at a stage before attachment of the plurality of segment coils 2 to the core 1.

The above order of the steps in the manufacturing process for the stator 20 is merely an example, and even if the order of the steps is changed, the stator 20 can be formed in the same manner.

Hereinafter, the coil alignment device and the coil alignment method for forming the coil assembly 10 according to the first embodiment will be described.

For describing the coil alignment device and the coil alignment method, first, the arrangement configuration of the leg portions 2a, 2b of the segment coils 2 in the slots 1s of the stator 20 will be described.

Figure 7:
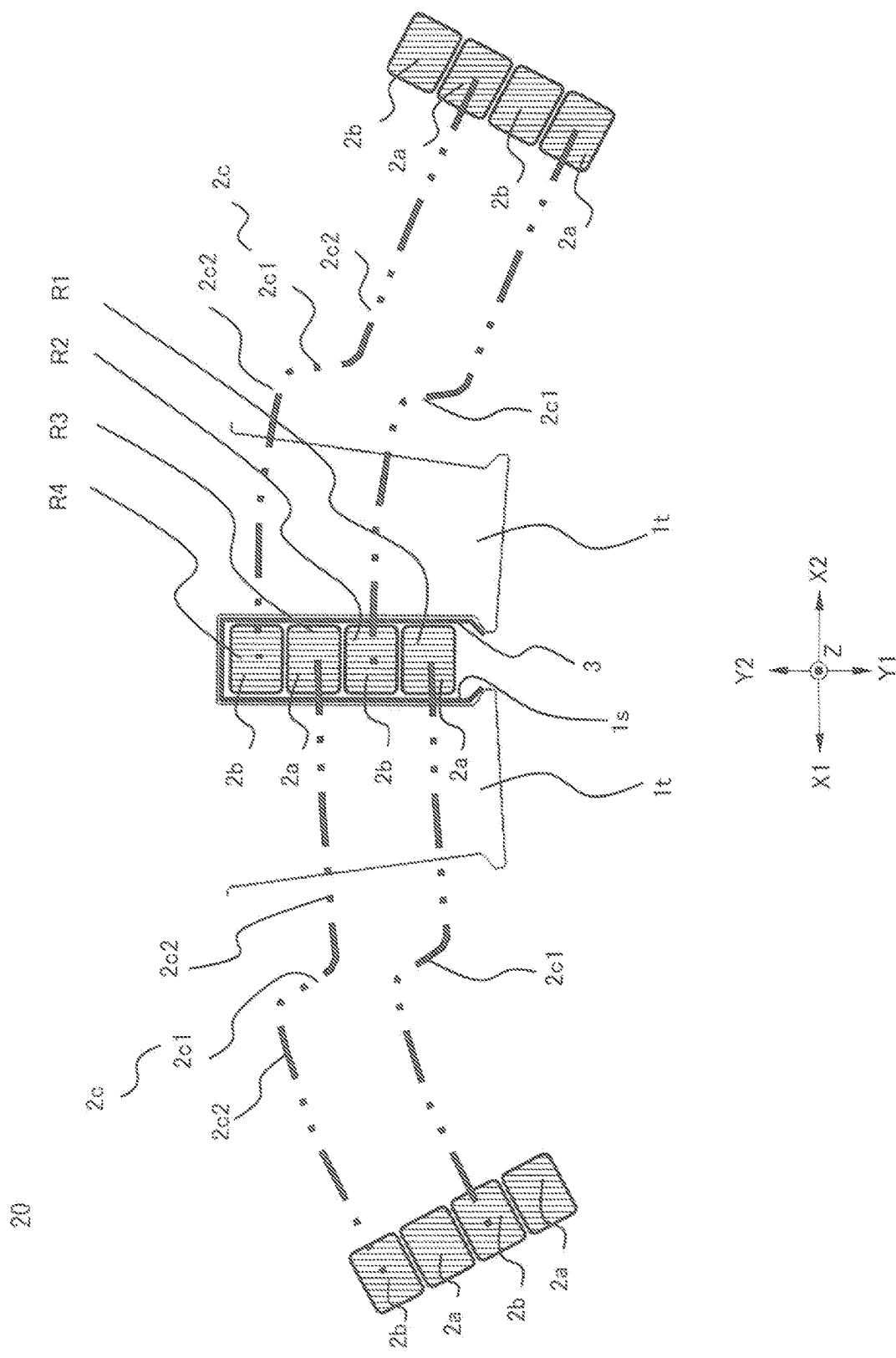
FIG. 7 is a schematic sectional view along a direction perpendicular to the axial direction of the stator according to the first embodiment.

FIG. 7 is a schematic sectoral view along a direction perpendicular to the axial direction Z of the stator 20 according to the first embodiment.

In FIG. 7, the cross-sections of the leg portions 2a, 2b of the segment coils 2 inserted in the slots is are shown by hatching. For facilitating the understanding, the connection portion 2c of each segment coil 2 is represented by a two-dot dashed line.

In FIG. 7, on the axial-direction lower side Z2 of the connection portions 2c of the segment coils 2, a plurality of slots 1s are actually arranged at set intervals in the circumferential direction X, but they are not shown.

As shown in FIG. 7, the leg portions 2a, 2b of the segment coils 2 are stored in the slots 1s formed between tooth portions 1t of the core 1 with insulation paper 3 interposed. The pair of leg portions 2a, 2b of each segment coil 2 are stored in different slots 1s while straddling over a set number of slots is in the circumferential direction X.

In the stator 20 of the present embodiment, in each slot 1s, four coil layers are formed in the order of a first segment coil layer R1, a second segment coil layer R2, a third segment coil layer R3, and then a fourth segment coil layer R4 from the radial-direction inner side Y1 toward a radial-direction outer side Y2.

As described above, at the top of the connection portion 2c of each segment coil 2, the transition portion 2cl through which the positions of the leg portions 2a, 2b of the segment coil 2 in the radial direction Y in the slot is are displaced from each other, is formed. In the stator 20 of the present embodiment, as shown in FIG. 7, the transition portion 2c1 is formed with such a bending angle that the pair of leg portions 2a, 2b of each segment coil 2 are displaced from each other by one layer in the radial direction Y between the respective slots is.

With this structure, at a coil end portion 10c of the coil assembly 10 protruding from the end surface on the axial-direction upper side Z1 of the core 1, the slope portions 2c2 of the segment coils 2 overlap each cither in the axial direction Z without interfering with different layers.

Next, the structure of a coil alignment device 100 will be described.

Figure 8:
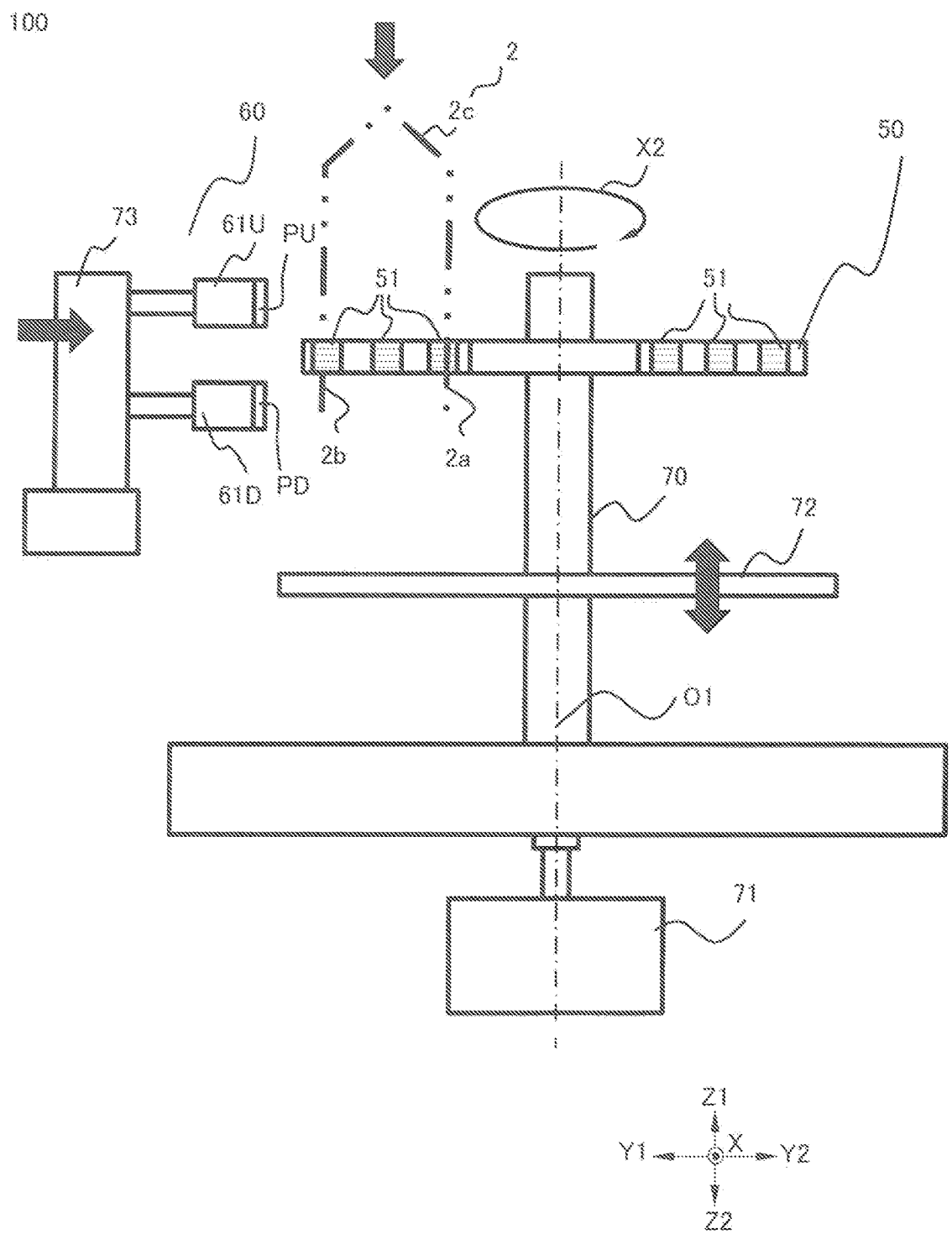
FIG. 8 shows the device outline of a coil alignment device according to the first embodiment and is a sectional view of the coil alignment device along a direction parallel to the axial direction.

FIG. 8 shows the device outline of the coil alignment device 100 of the first embodiment for forming the coil assembly 10 and is a sectional view of the coil alignment device 100 along a direction parallel to the axial direction Z.

Figure 9:
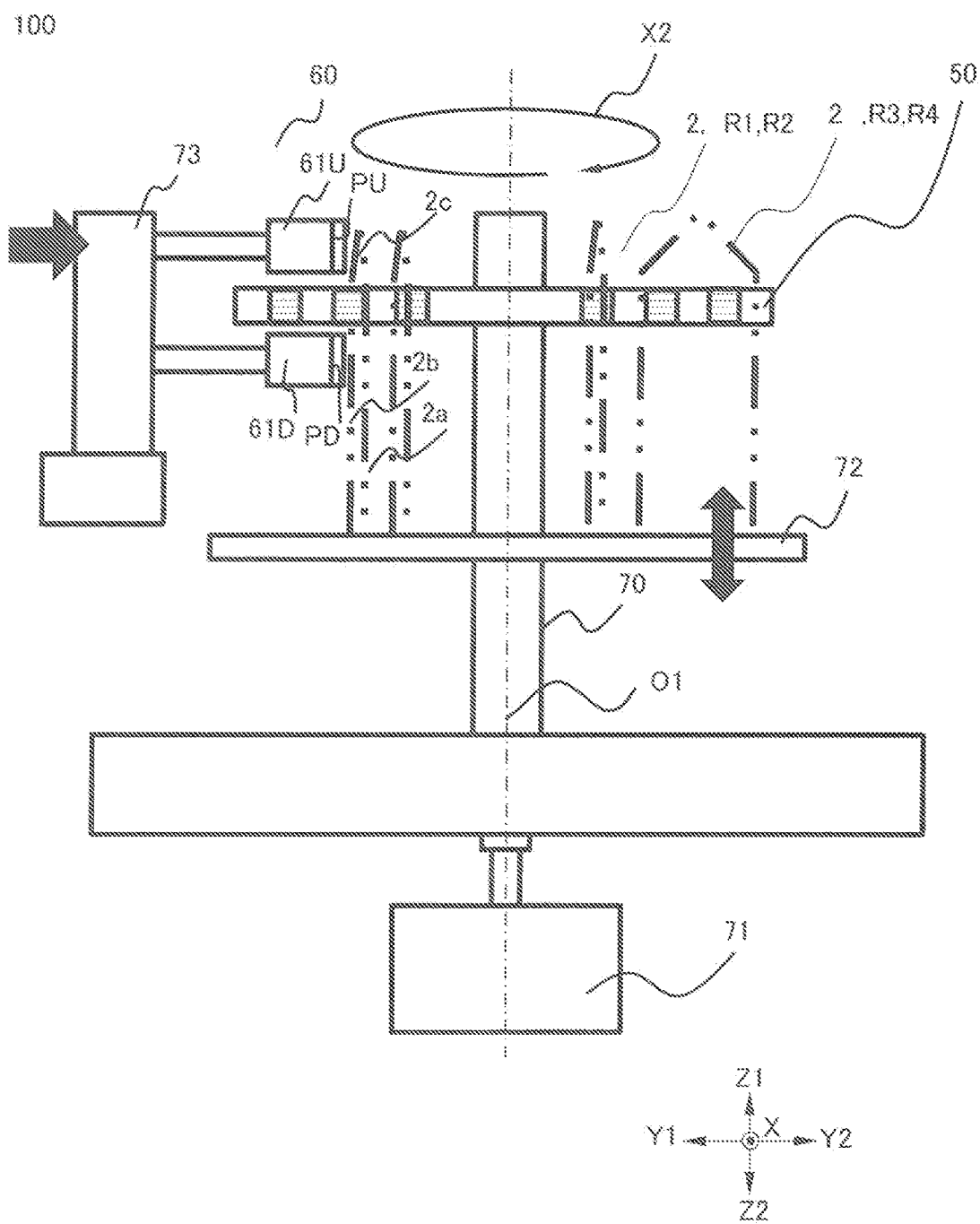
FIG. 9 is a sectional view of the coil alignment device along a direction parallel to the axial direction, illustrating operation of the coil alignment device according to the first embodiment.

FIG. 9 is a sectional view of the coil alignment device 100 along a direction parallel to the axial direction Z, illustrating operation of the coil alignment device 100 of the first embodiment.

Figure 10:
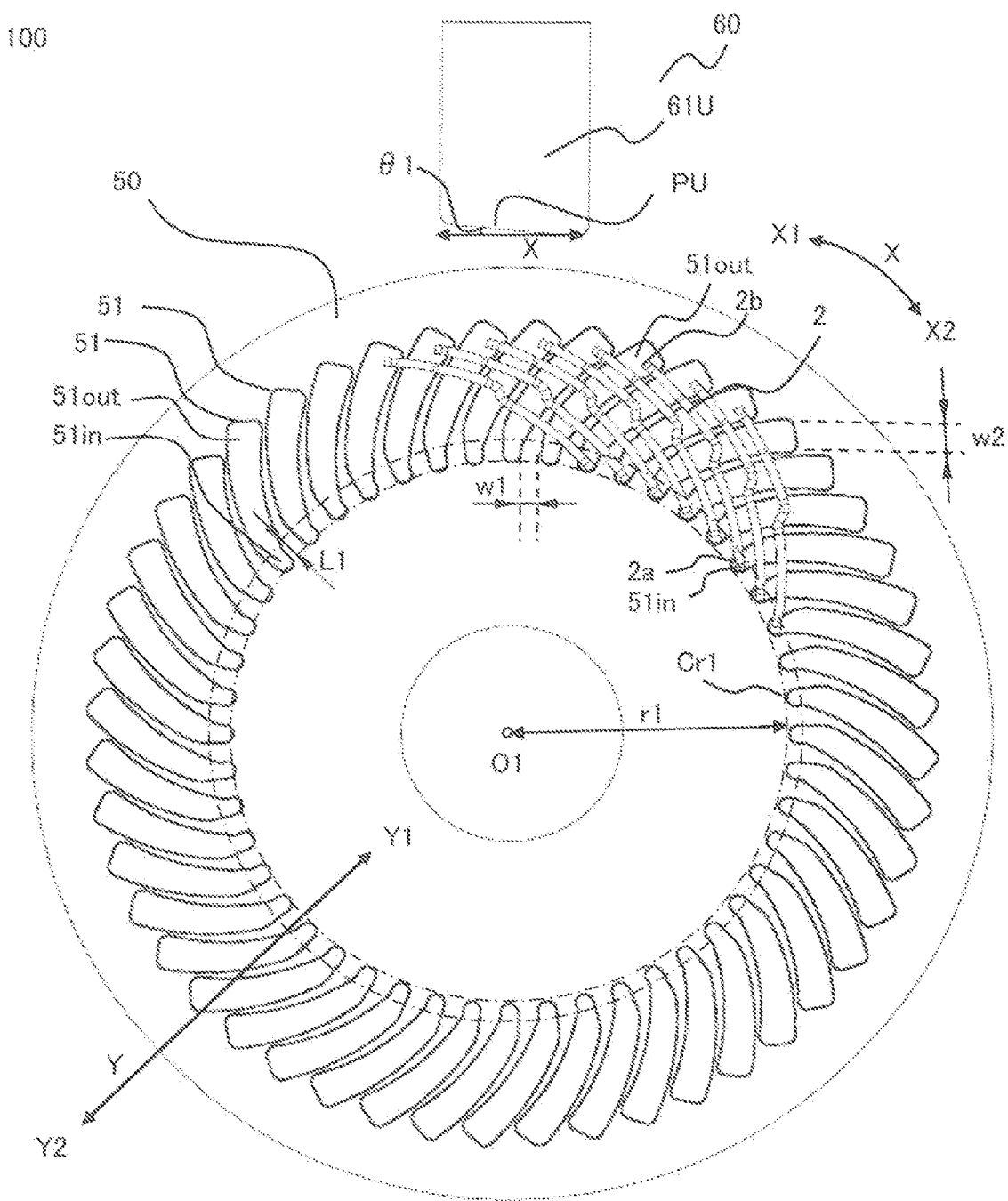
FIG. 10 is a plan view of the coil alignment device as seen from an axial-direction upper side, illustrating operation of the coil alignment device according to the first embodiment.

FIG. 10 is a plan view of the coil alignment device 100 as seen from the axial-direction upper side Z1, illustrating operation of the coil alignment device 100 of the first embodiment.

As shown in FIG. 8, the coil alignment device 100 includes a planar alignment guide 50 as a first jig for positioning the segment coils 2, and a convergence tool 60 as a second jig for pressing each segment coil 2 positioned by the alignment guide 50 from the radial-direction outer side Y2.

The alignment guide 50 is rotatably supported by a rotational driving portion 71 via a rotary shaft 70.

As shown in FIG. 10, the alignment guide 50 has forty-eight guide grooves 51 as grooves into which the leg portions 2a, 2b of the segment coils 2 are to be inserted.

The guide grooves 51 are arranged at set intervals w1 along the circumferential direction X on a first circle Cr1 located at a first distance r1 from an axial point O1 as a first point of the alignment guide 50 such that each guide groove 51 extends from the first circle Cr1 toward the outer circumference on the radial-direction outer side Y2 of the alignment guide 50.

FIG. 10 shows a state in which eight segment coils 2 are inserted in the respective guide grooves 51.

Each guide groove 51 includes a storage portion 51in of which the inner wall on one side X1 in the circumferential direction extends in a straight shape along the radial direction Y from the first circle Cr1, and a guiding portion 51out further extending toward the outer circumference on the radial-direction outer side Y2 of the alignment guide 50 while sloping toward another side X2 in the circumferential direction from the storage portion 51in.

As described above, each guide groove 51 has the storage portion 51in on the innermost side in the radial direction Y and has the guiding portion 51out on the radial-direction outer side Y2 of the storage portion 51in.

The inner wall on the one side X in the circumferential direction of the storage portion 51in is formed in such a first length L1 that allows a plurality of the leg portions 2a, 2b of the segment coils 2 to be stored side by side along the radial direction Y.

In the present embodiment, the first length L1 is such a length that allows at least four leg portions 2a, 2b to be stored side by side along the radial direction Y.

As shown in FIG. 8, the convergence tool. 60 has an upper pressing portion 610 located on the axial-direction upper side Z1 relative to the end surface on the axial-direction upper side Z1 of the planar alignment guide 50, and a lower pressing portion 61D located on the axial-direction lower side Z2 relative to the end surface on the axial-direction lower side Z2 of the alignment guide 50.

The convergence tool 60 is supported by a linear drive portion 73 so as to be movable linearly in the radial direction Y relative to the alignment guide 50.

Thus, the convergence tool 60 can press the leg portions 2b and the connection portion 2c of each segment coil 2 inserted in the guide grooves 51 of the alignment guide 50, from the radial-direction outer side Y2 toward the radial-direction inner side Y1, by press surfaces PU, PD of the pressing portions 61 (upper pressing portion 61U, lower pressing portion 610).

As shown in FIG. 10, the press surface PU is sloped at a set angle θ1 with respect to the circumferential direction X such that the one side X in the circumferential direction thereof is located on the radial-direction outermost side Y2.

Although not shown, the press surface PD is also sloped at the set angle L1 with respect to the circumferential direction X such that the one side X1 in the circumferential direction thereof is located on the radial-direction outermost side Y2.

Next, the coil alignment method by the coil alignment device 100, which is a major part of the first embodiment, will be described. That is, the process from the coil putting and positioning step S3C to the first alignment step S4C in FIG. 2 described above will be described in detail, including operation of the coil alignment device 100.

Figure 11:
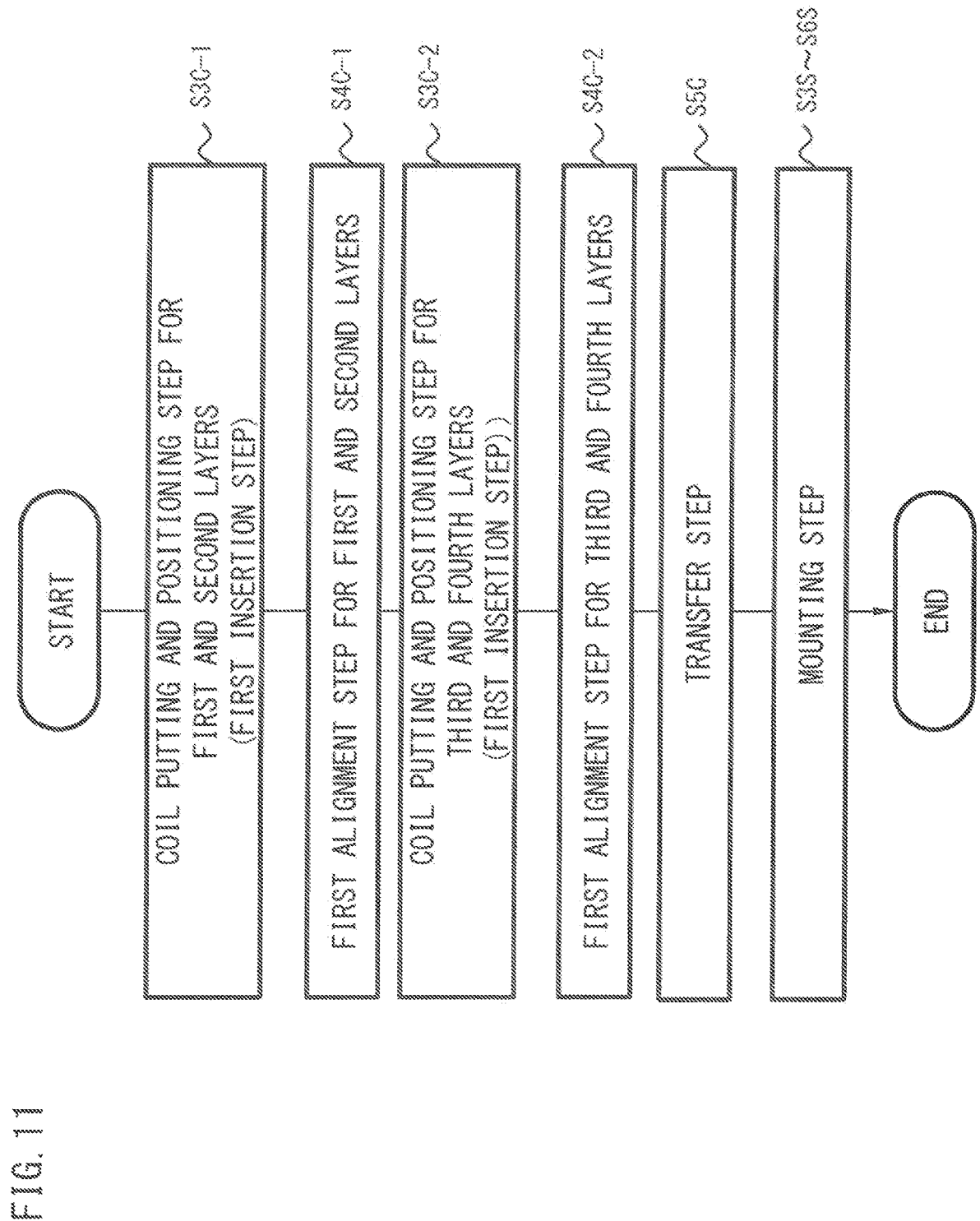
FIG. 11 is a flowchart schematically showing a manufacturing process for the coil assembly by the coil alignment device and the coil alignment method according to the first embodiment.

FIG. 11 is a flowchart schematically showing the manufacturing process for the coil assembly 10 by the coil alignment device 100 and the coil alignment method according to the first embodiment.

Steps S3C-1 and S3C-2 in FIG. 11 correspond to step S3C, i.e., the coil putting and positioning step in FIG. 2, and steps S4C-1 and 34C-2 in FIG. 11 correspond to step S4C, i.e., the first alignment step in FIG. 2.

Figure 12:
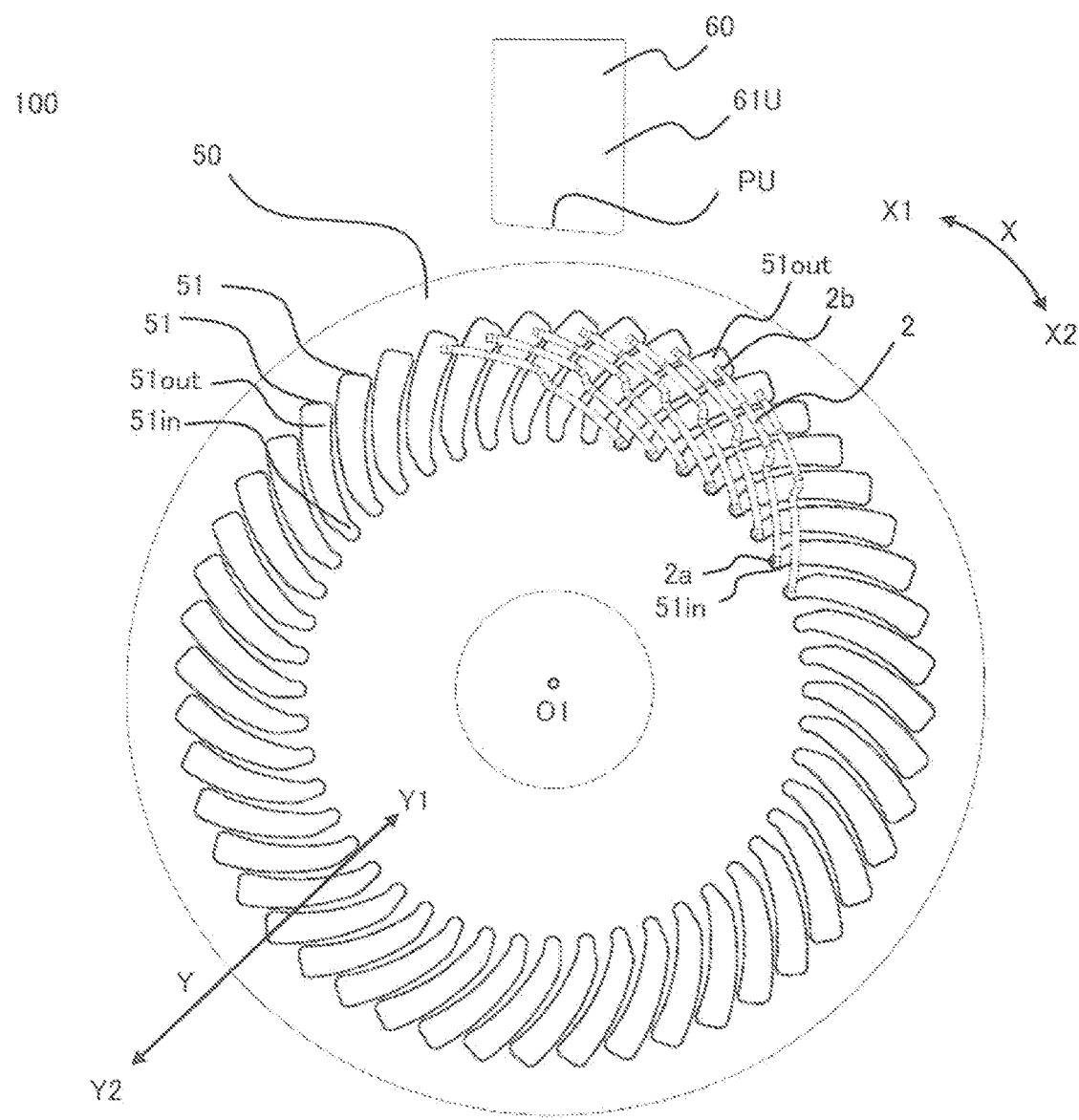
FIG. 12 shows a state in which segment coils to form the first and second layers are inserted in guide grooves, in the coil alignment device and the coil alignment method according to the first embodiment.

FIG. 12 shows a state in which eight segment coils 2 to form the first and second layers in the slots is are inserted in the guide grooves 51, in the coil alignment device 100 and the coil alignment method according to the first embodiment.

Figure 13:
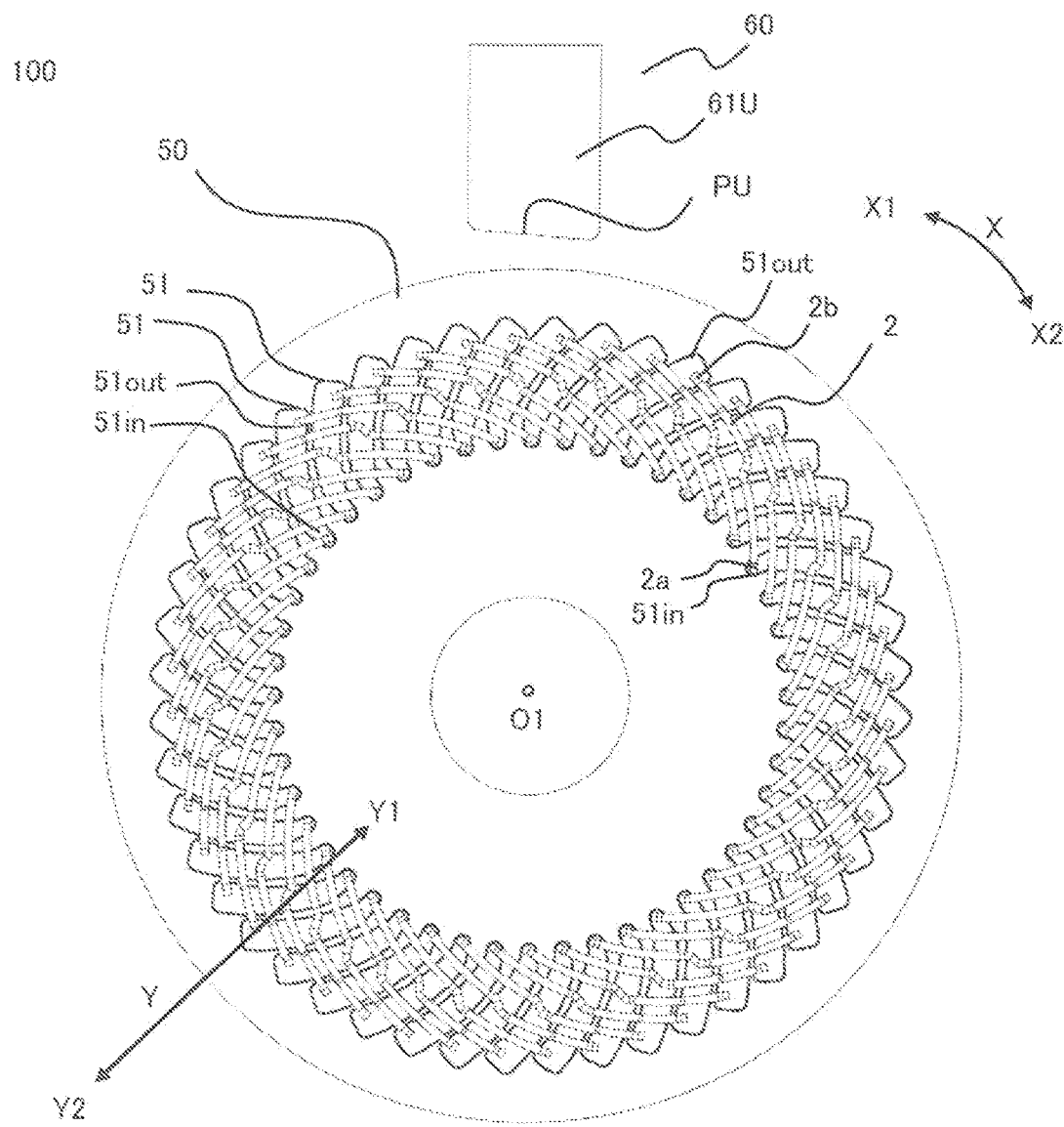
FIG. 13 shows a state in which the segment coils to form the first and second layers are inserted in the guide grooves, in the coil alignment device and the coil alignment method according to the first embodiment.

FIG. 13 shows a state in which forty-eight segment coils 2 to form the first and second layers in the slots is are inserted in the guide grooves 51, in the coil alignment device 100 and the coil alignment method according to the first embodiment.

Figure 14:
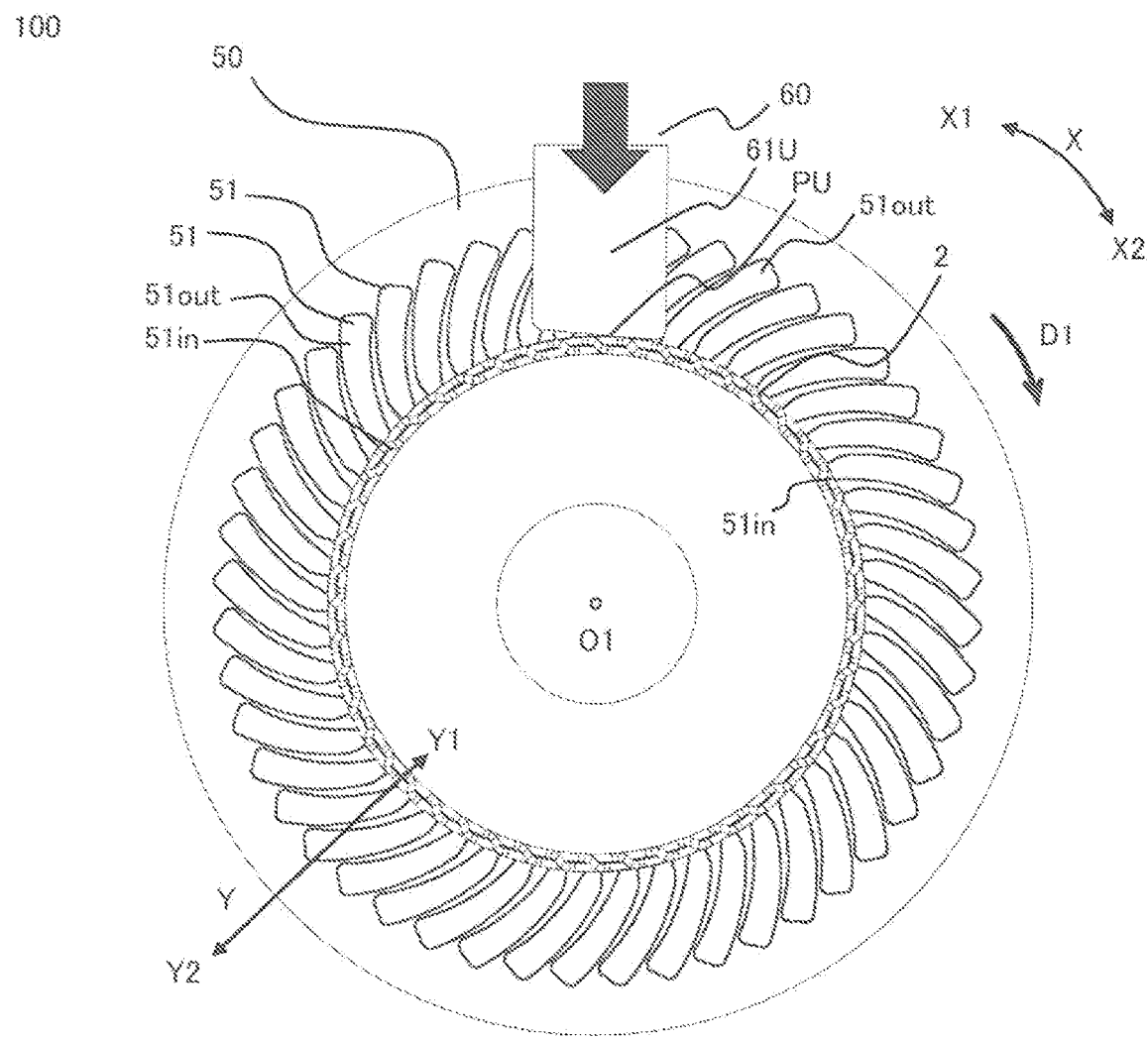
FIG. 14 shows a state in which the segment coils are converged to a radial-direction inner side, in the coil alignment device and the coil alignment method according to the first embodiment.

FIG. 14 shows a state in which the postures of the segment coils 2 to form the first and second layers in the slots 1s are changed and the segment coils 2 are converged to the radial-direction inner side Y1, in the coil alignment device 100 and the coil alignment method according to the first embodiment.

First, as shown in FIG. 12, with the pair of leg portions 2a, 2b of each segment coil 2 opened from each other, the leg portions 2a, 2b are respectively put into the guide grooves 51 from the axial-direction upper side Z1.

The put leg portions 2a, 2b and the connection portions 2c of the segment coils 2 contact with the inner walls of the guide grooves 51 and the end surface on the axial-direction upper side Z. of the alignment guide 50, whereby the segment coils 2 are positioned and supported by the alignment guide 50.

At this time, regarding each segment coil 2, one leg portion 2a (first leg portion) of the pair of leg portions 2a, 2b is inserted into the storage portion 51in of the guide groove 51 on the other side X2 in the circumferential direction which corresponds to a second-direction side, and the other leg portion 2b (second leg portion) is inserted into the guiding portion 51out of a different guide groove 51 located on the one side X1 in the circumferential direction which corresponds to a first-direction side while straddling over a plurality of guide grooves 51.

Then, as shown in FIG. 13, forty-eight segment coils 2 are respectively inserted into forty-eight guide grooves 51 (step S3C-1, coil putting and positioning step for first and second layers, first insertion step).

Here, the guide groove 52 in which one leg portion 2a of the pair of leg portions 2a, 2b of each segment coil 2 is inserted, is defined as a first groove, and the guide groove 51 which is located toward the one side X1 in the circumferential direction from the first groove and in which the other leg portion 2b is inserted, is defined as a second groove.

Next, as shown in FIG. 14, while the alignment guide 50 is rotationally driven in the direction of arrow D1, i.e., toward the other side X2 in the circumferential direction, the convergence tool 60 is linearly moved from the radial-direction outer side Y2 toward the radial-direction inner side Y1. Thus, the convergence tool 60 contacts with radial-direction outer side Y2 parts of the connection portion 2c and the leg portion 2b inserted in the guiding portion 51out of the second groove (guide groove 51 on the one side X1 in the circumferential direction), and presses then toward the radial-direction inner side Y1.

With each segment coil 2 pressed by the convergence tool 60, the other leg portion 2b inserted in the guiding portion 51out of the second groove moves toward the radial-direction inner side Y1 along the inner wall of the guiding portion 51out of the second groove, rotationally around the one leg portion 2a inserted in the storage portion 51in of the first groove. Thus, the other leg portion 2b is stored into the storage portion 51in on the radial-direction inner side Y1 which is a convergence position, so that, as shown in FIG. 14, the one leg portion 2a of one segment coil 2 and the other leg portion 2b of a different segment coil 2 contact with each other in the storage portion 51in.

Further, as the alignment guide 50 is continuously rotated, the segment coils 2 are stored into the storage portions 51in in the order from the segment coil 2 adjacent to the segment coil 2 with which the convergence tool 60 contacts first. Specifically, as the alignment guide 50 is continuously rotated toward the other side X2 in the circumferential direction, the segment coils 2 are sequentially stored into the storage portions 51in in the order from the segment coil. 2 adjacent on the one side X1 in the circumferential direction of the segment coil 2 with which the convergence tool 60 contacts first, toward the segment coil 2 on the one side X1 in the circumferential direction.

As a result, all the segment coils 2 over the entire circumference of the alignment guide 50 are changed in posture and aligned so that the leg portions 2a, 2b are stored in the storage portions 51in.

In this way, as shown in FIG. 14, all the segment coils 2 are converged to the radial-direction inner side Y1. Thus, the alignment step for the segment coils 2 to form the first and second layers in the slots is is completed (step S4C-1, first alignment step for first and second layers).

Thereafter, the convergence tool 60 is moved to the radial-direction outer side Y2.

Next, alignment operation for the segment coils 2 to form the third and fourth layers in the slots 1s will be described.

Figure 15:
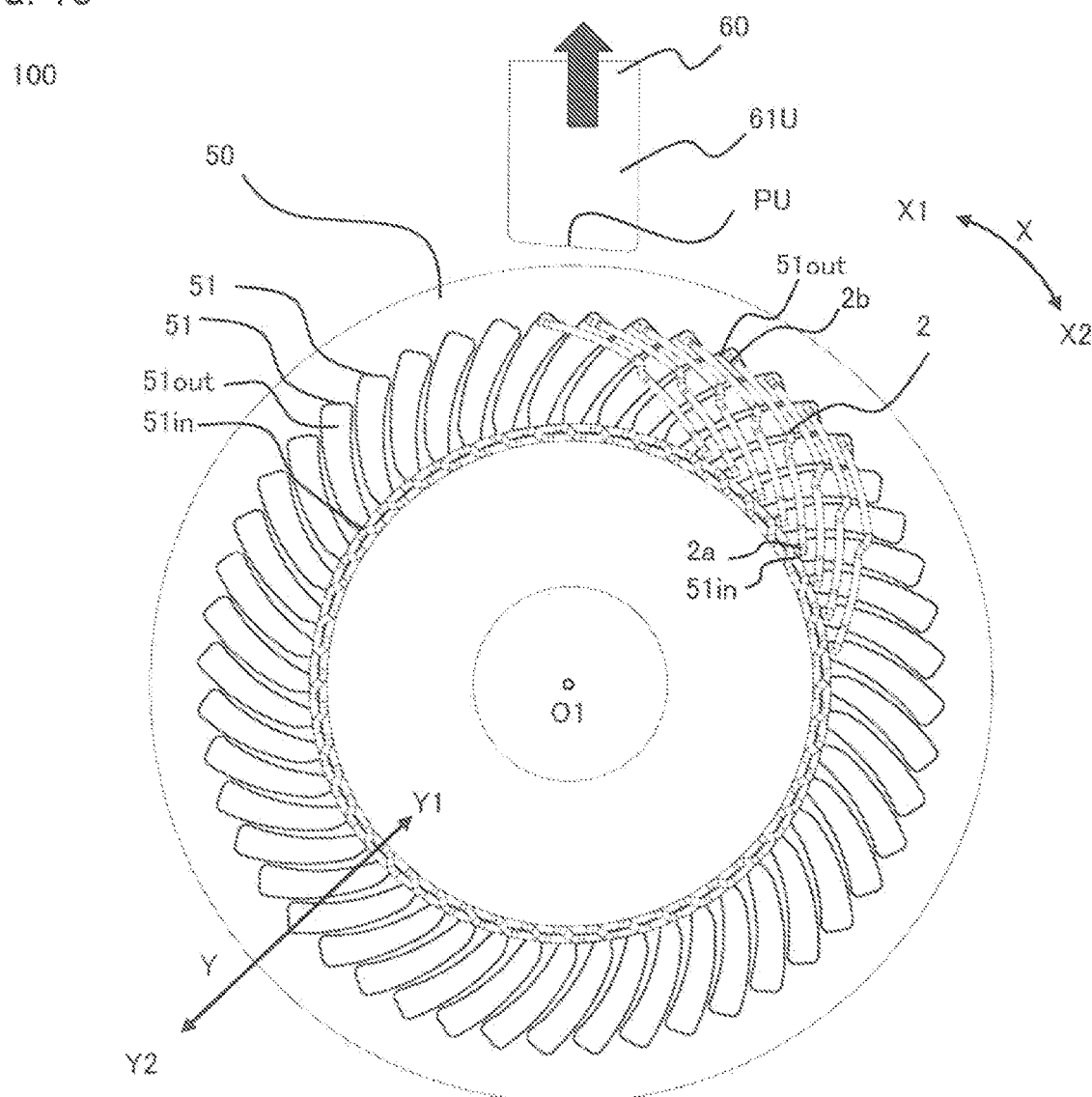
FIG. 15 shows a state in which segment coils to form the third and fourth layers are inserted in the guide grooves, in the coil alignment device and the coil alignment method according to the first embodiment.

FIG. 15 shows a state in which eight segment coils 2 to form the third and fourth layers in the slots is are inserted in the guide grooves 51, in the coil alignment device 100 and the coil alignment method according to the first embodiment.

Figure 16:
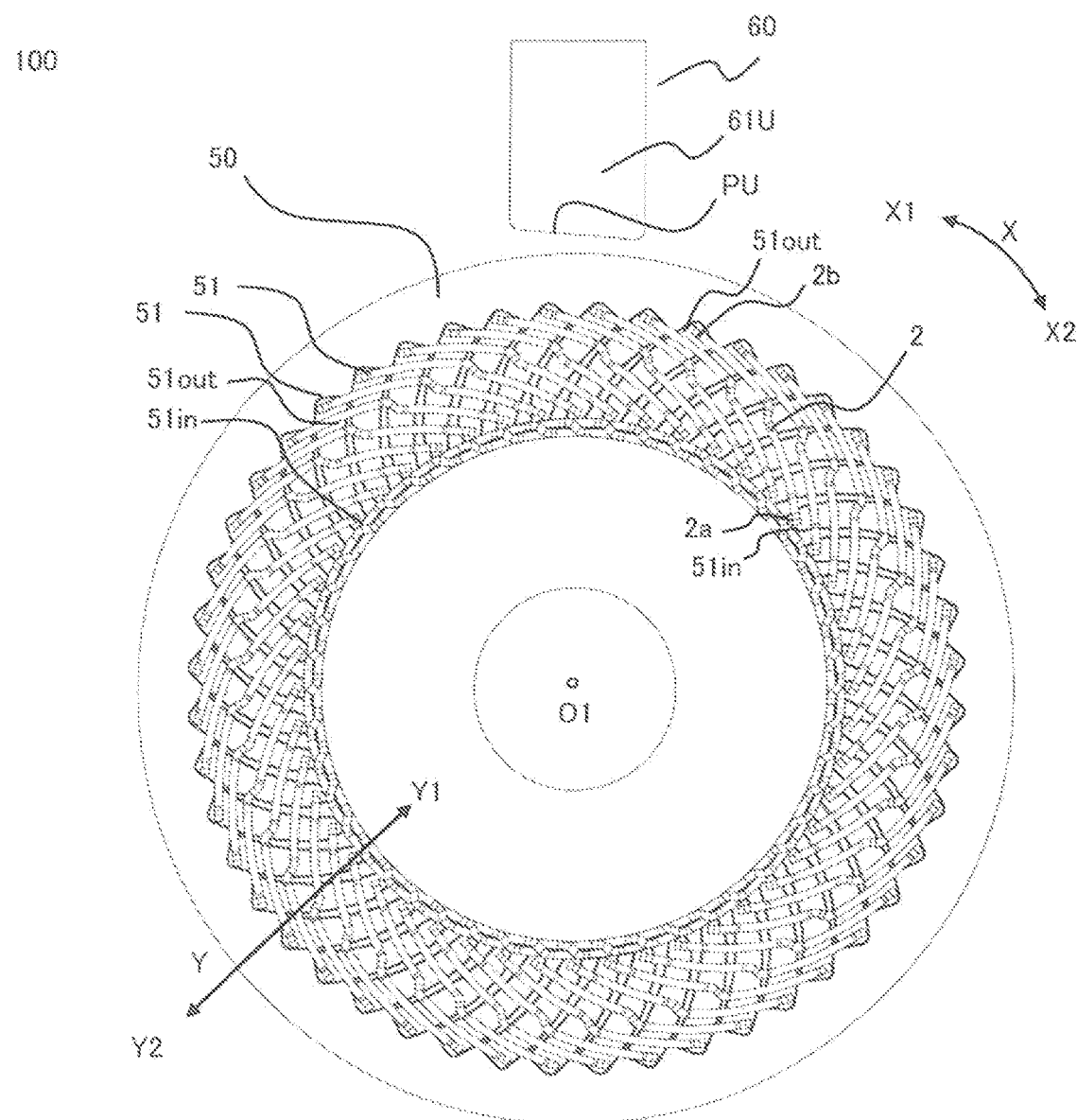
FIG. 16 shows a state in which the segment coils to form the third and fourth layers are inserted in the guide grooves, in the coil alignment device and the coil alignment method according to the first embodiment.

FIG. 16 shows a state in which forty-eight segment coils 2 to form the third and fourth layers in the slots 1s are inserted in the guide grooves 51, in the coil alignment device 100 and the coil alignment method according to the first embodiment.

Figure 17:
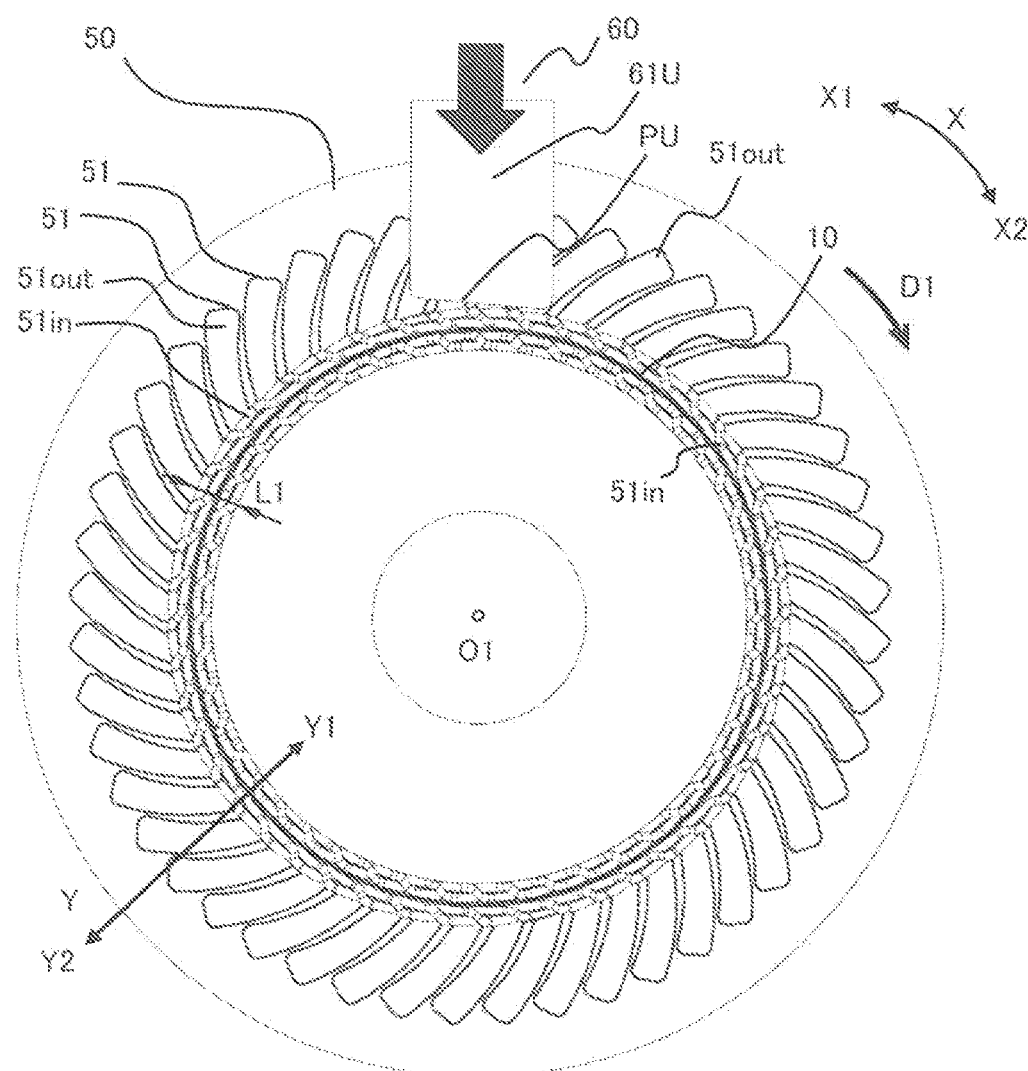
FIG. 17 shows a state in which the segment coils are converged to the radial-direction inner side, in the coil alignment device and the coil alignment method according to the first embodiment.

FIG. 17 shows a state in which the postures of the segment coils 2 to form the third and fourth layers in the slots 1s are changed and the segment coils 2 are converged to the radial-direction inner side Y1, in the coil alignment device 100 and the coil alignment method according to the first embodiment.

First, the segment coils 2 to form the third and fourth layers are further inserted into the alignment guide 50 in a state in which the segment coils 2 to form the first and second layers have been converged in the storage portions 51in of the guide groove 51.

As shown in FIG. 15, with the leg portions 2a, 2b of the segment coil 2 opened, the leg portions 2a, 2b are respectively inserted into the guide grooves 51 on the radial-direction outer side Y2 of the segment coils 2 to form the first and second layers.

At this time, regarding each segment coil 2, one leg portion 2a (first leg portion) of the pair of leg portions 2a, 2b is inserted, on the radial-direction outer side Y2 of the segment coil. 2 for the first and second layers, in the storage portion 51in of the guide groove 51 on the other side X2 in the circumferential direction, and the other leg portion 2b (second leg portion) is inserted into the guiding portion 51*out* of a different guide groove 51 located on the one side X1 in the circumferential direction while straddling over a plurality of guide grooves 51.

Then, as shown in FIG. 16, forty-eight segment coils 2 are respectively inserted into the forty-eight guide grooves 51 (step S3C-2, coil putting and positioning step for third and fourth layers).

Next, as shown in FIG. 17, while the alignment guide 50 is rotationally driven in the direction of arrow D1, i.e., toward the other side X2 in the circumferential direction, the convergence tool 60 is linearly moved from the radial-direction outer side Y2 toward the radial-direction inner side Y1. Thus, the convergence tool 60 contacts with radial-direction outer side Y2 parts of the connection portion 2*c* and the leg portion 2*b* inserted in the guiding portion 51*out* of the second groove (guide groove 51 on the one side X1 in the circumferential direction), and presses them toward the radial-direction inner side Y1.

Then, as in the case where the segment coils 2 to form the first and second layers are converged to the radial-direction inner side Y1, with each segment coil 2 pressed by the convergence tool 60, the other leg portion 2*b* inserted in the guiding portion 51*out* of the second groove moves toward the radial-direction inner side Y1 along the inner wall of the guiding portion 51*out* of the second groove, rotationally around the one leg portion 2*a* inserted in the storage portion 51*in* of the first groove, and is stored into the storage portion 51*in*.

Here, as described above, the storage portion 51in of the present embodiment has such a first length L1 that allows four leg portions 2*a*, 2*b* of the segment coils 2, i.e., four layers, to be stored side by side along the radial direction Y. Thus, in the storage portion 51*in* of each guide groove 51, the leg portions 2*a*, 2*b* of the segment coils 2 for four layers are converged so as to be arranged side by side along the radial direction Y, whereby the coil assembly 10 is formed.

Here, the axial point O1 as the first point of the alignment guide 50 corresponds to the center point of the formed annular coil assembly 1.

In this way, execution of the coil putting and positioning step and the first alignment step is repeated twice, whereby it becomes possible to form the coil assembly 10 having a desired number of layers using the same alignment guide 50 and the same convergence tool 60 without the need of another device or an additional mechanism and a dedicated jig.

Figure 18:
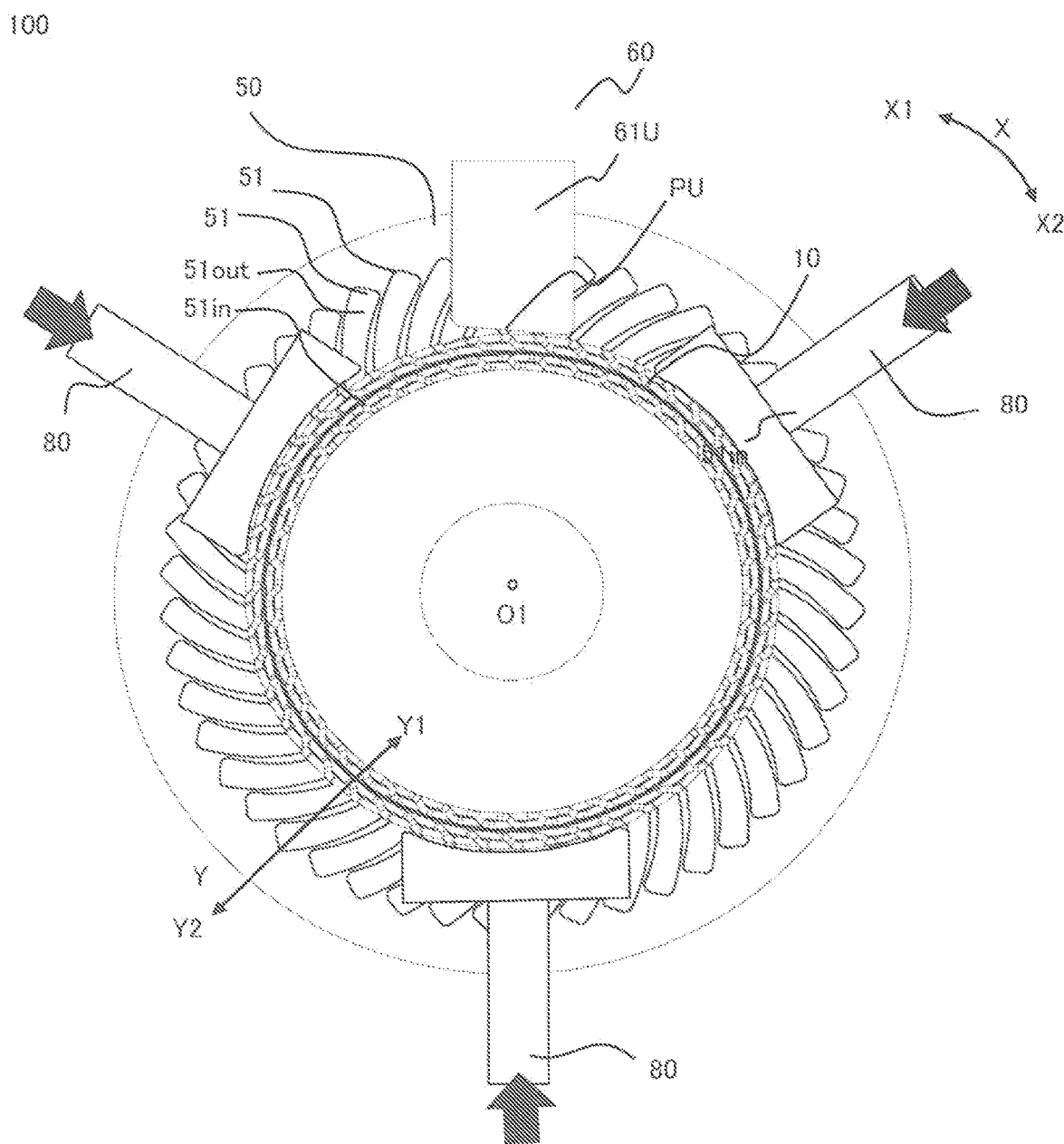
FIG. 18 shows a transfer method for the coil assembly formed by the coil alignment device and the coil alignment method according to the first embodiment.

FIG. 18 shows a transfer method for the coil assembly 10 formed by the coil alignment device 100 and the coil alignment method according to the first embodiment.

An elevating plate 72 on the axial-direction lower side Z2 of the alignment guide 50 is elevated toward the axial-direction upper side Z1 to push the leg portions 2*a*, 2*b* of the coil assembly 10 toward the axial-direction upper side Z1, whereby the coil end portion 10*c* is further exposed from the end surface on the axial-direction upper side Z1 of the alignment guide 50.

Then, the coil assembly 10 is transferred in a state in which the coil end portion 10*c* of the coil assembly 10 or the leg portions 2*a*, 2*b* of the segment coils 2 are held by holding portions 80 from the radial-direction outer side Y2 (step S5C, transfer step).

Then, as described above, through the process from step S3S to step S6S shown in FIG. 2, the coil assembly 10 is mounted to the stator 20, thus forming the stator 20 of the rotary electric machine.

In the above description, the case of forming the coil assembly 10 having four layers has been described. However, the coil assembly 10 having six or more layers can also be formed in the same manner.

In the above description, the shape of the storage portion 51*in* of the guide groove 51 is described such that the inner wall on the one side X1 in the circumferential direction has such a length that allows a plurality of leg portions 2*a*, 2*b* to be stored side by side in the radial direction Y and extends in a straight shape along the radial direction Y.

However, the shape of the storage portion 51*in* is not limited thereto. For example, the inner wall on the other side X2 in the circumferential direction may extend in a straight shape along the radial direction Y.

As long as the storage portion 51*in* has such a shape that the inner wall on at least one side in the circumferential direction extends straightly along the radial direction Y, the converged leg portions 2*a*, 2*b* of the segment coils 2 can be arranged side by side straightly along the radial direction Y. Thus, the leg portions 2*a*, 2*b* converged in the storage portions 51*in* can be inserted into the slots 1*s* of the core 1.

Further, with the storage portions 51*in* formed to extend in a straight shape along the radial direction Y as described above, a sufficient thickness (width w1) can be ensured between the guide grooves 51. Thus, an appropriate strength can be ensured for the alignment guide 50.

Further, the shapes of the storage portions 51in may be more matched with the shapes of the slots is of the stator 20 so that the leg portions 2*a*, 2*b* of the segment coils stored in the storage portions 51*in* will be arranged more accurately with respect to the radial direction Y in the slots is of the stator 20.

For example, the first circle Cr1 for determining the positions on the radial-direction inner side Y1 of the storage portions 51*in* may be designed to have the same diameter as a circle connecting the radial-direction inner side Y1 parts of the slots is of the core 1.

In the above description, the shape of the guiding portion 51*out* of the guide groove 51 is described such that the inner walls on both sides in the circumferential direction X of the guiding portion 51*out* are sloped toward the other side X2 in the circumferential direction.

However, without limitation thereto, the guiding portion 51*out* of the guide groove 51 may have such a first shape that, using, as a fulcrum, one leg portion 2*a* inserted in the storage portion 51*in* of the guide groove 51 on the other side X2 in the circumferential direction, the other leg portion 2*b* inserted in the guiding portion 51*out* of the guide groove 51 on the one side X1 in the circumferential direction can move toward the storage portion 51*in* in the guiding portion 51*out* of this second groove.

That is, a groove width w2 of the guiding portion 51*out* shown in FIG. 10 may have a clearance for the leg portion 2*b* so as to allow the leg portion 2*b* to move using the leg portion 2*a* as a fulcrum.

The first shape of the guiding portion 51*out* may be made such that, for example, of the inner walls on both sides in the circumferential direction X of the guiding portion 51out, only the inner wall on at least one side may be sloped toward the other side X2 in the circumferential direction.

As an alternative example, the first shape of the guiding portion 51*out* may be made such that, of the inner walls on both sides in the circumferential direction X of the guiding portion 51out, the inner wall on at least one side has such a curvature that the leg portion 2*b* is moved into the storage portion while sliding on the inner wall of the guiding portion 51out, using the leg portion 2*a* as a fulcrum.

Since the guiding portion 51*out* is formed in such a first shape, regarding each segment coil 2 inserted in the guide grooves 51, the other leg portion 2*b* inserted in the guiding portion 51*out* of the guide groove 51 on the one side X1 in the circumferential direction can assuredly move toward the storage portion 51*in* rotationally around the one leg portion 2*a* inserted in the storage portion S1in of the guide groove 51 on the other side X2 in the circumferential direction.

Regarding the segment coil 2, the other leg portion 2*b* moves using, as a fulcrum, the one leg portion 2*a* inserted in the storage portion 51*in*. In this case, the leg portion 2*a* as a fulcrum may be rotated around the axis thereof. Therefore, the inner wall of the storage portion 51*in* may be formed in such a shape that supports the one leg portion 2*a* of the segment coil 2 inserted in the storage portion 51*in* so that the one leg portion 2*a* is rotatable around the axis of the leg portion 2*a*.

Thus, since the other leg portion 2*a* smoothly rotates using the rotating leg portion 2*a* as a fulcrum, occurrence of twisting of each segment coil 2 or the like can be prevented when the segment coils 2 are converged to the radial-direction inner side Y1.

In the above description, the example in which the alignment guide 50 is rotated toward the other side X2 in the circumferential direction has been shown, but the present disclosure is not limited thereto. The alignment guide 50 and/or the convergence tool 60 may be rotationally driven. Any configuration in which the alignment guide 50 is rotated toward the other side X2 in the circumferential direction relative to the convergence tool 60 may be applied. For example, while the alignment guide 50 is rotated toward the other side X2 in the circumferential direction, the convergence tool 60 may be rotated toward the one side X in the circumferential direction.

In this case, operation time can be shortened and therefore production efficiency is also expected to be improved. In addition, if a plurality of convergence tools 60 are provided along the circumferential direction X, it is possible to converge all the segment coil 2 in an annular shape without performing rotational driving for one revolution.

In the above description, the example in which the convergence tool 60 is linearly moved toward the alignment guide 50 has been shown, but the present disclosure is not limited thereto. For example, the alignment guide 50 may be configured to have a linear drive portion and thus the alignment guide 50 may be linearly moved toward the convergence tool 60. That is, it is possible to use any drive mechanism that allows the convergence tool 60 to contact with the segment coils 2 by reducing the relative distance of the convergence tool 60 to the alignment guide 50.

The slope angle θ1 of the press surfaces PU, PD of the upper pressing portion 61U and the lower pressing portion 61D of the convergence tool 60 with respect to the circumferential direction X may be changed in accordance with the length in the radial direction Y of the guide groove 51.

Regarding the press position of the segment coil 2 by the convergence tool 60, the connection portion 2*c* and/or the leg portions 2*a*, 2*b* of the segment coil may be pressed. Thus, a plurality of segment coils 2 can be assuredly converged to the radial-direction inner side Y1. As long as the convergence tool 60 is provided with the pressing portion 61 and can press the segment coil 2, the shape, the angle, or the like thereof may be freely set.

Hereinafter, a coil alignment device 100E1 having a structure different from the coil alignment device 100 described above will be described.

Figure 19:
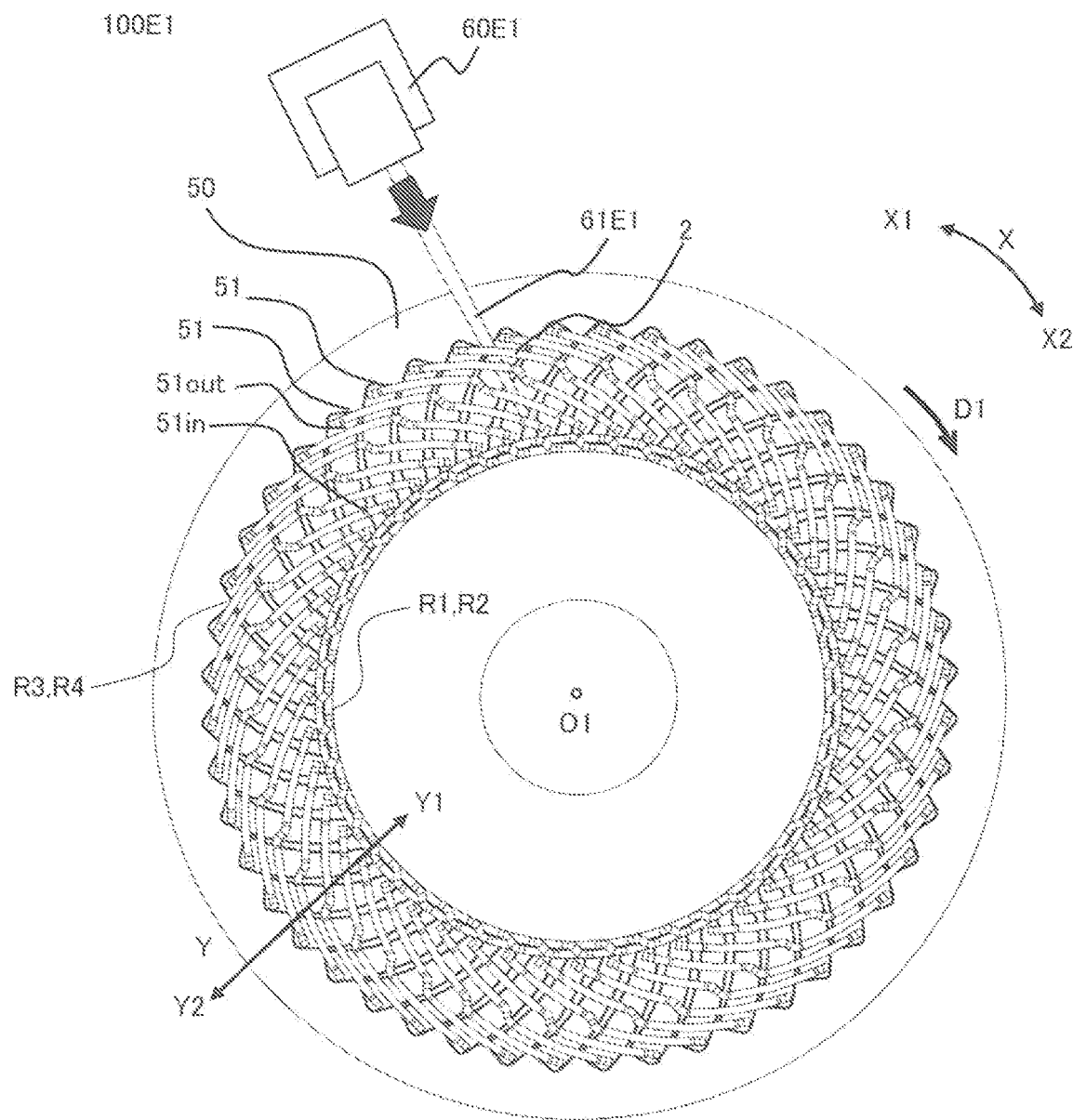
FIG. 19 shows the structure of another coil alignment device according to the first embodiment and is a plan view of the coil alignment device as seen from the axial-direction upper side.

FIG. 19 shows the structure of the coil alignment device 100E1 of the first embodiment and is a plan view of the coil alignment device 100E1 as seen from the axial-direction upper side Z1.

A pressing portion 61E1 of a convergence tool 60E1 in the coil alignment device 100E1 has, at an end part, a wedge shape so as to taper toward the radial-direction inner side Y1. A distal end of the pressing portion 61E1 comes into contact with the connection portion 2*c* or the leg portions 2*a*, 2*b* of the segment coil 2.

By forming the pressing portion 61E1 of the convergence tool 60E1 in a wedge shape (hereinafter, referred to as wedge tool 60E1) as described above, as shown in FIG. 19, it is possible to move the connection portion 2*c* or the leg portions 2*a*, 2*b* of the segment coil 2 in the guide groove 51 toward the radial-direction inner side Y1 while putting the pressing portion 61E1 into a gap between the segment coils 2.

In addition, at the same time as the slope portions 2*c*2 of the connection portions 2*c* of the segment coils 2 adjacent to each other in the radial direction Y overlap each other in the axial direction Z, the wedge tool 60E1 can be operated in a coordinated manner so as to recede toward the radial-direction outer side Y2, whereby an area for pressing each segment coil 2 can be ensured. Thus, the segment coils 2 can be assuredly converged in an annular shape.

Also in the coil alignment device 100E1, the wedge tool 60E1 may be rotated in the circumferential direction X, in addition to linear movement in the radial direction Y.

In FIG. 19, the example in which only one wedge tool 60E1 is provided is shown. However, a plurality of wedge tools 60E1 may be provided along the circumferential direction X. In this case, it becomes possible to converge all the segment coils 2 in an annular shape without performing rotational driving for one revolution. Thus, production efficiency can be improved.

Hereinafter, a coil alignment device 100E2 having a structure different from the coil alignment devices 100 and 100E1 described above will be described.

Figure 20:
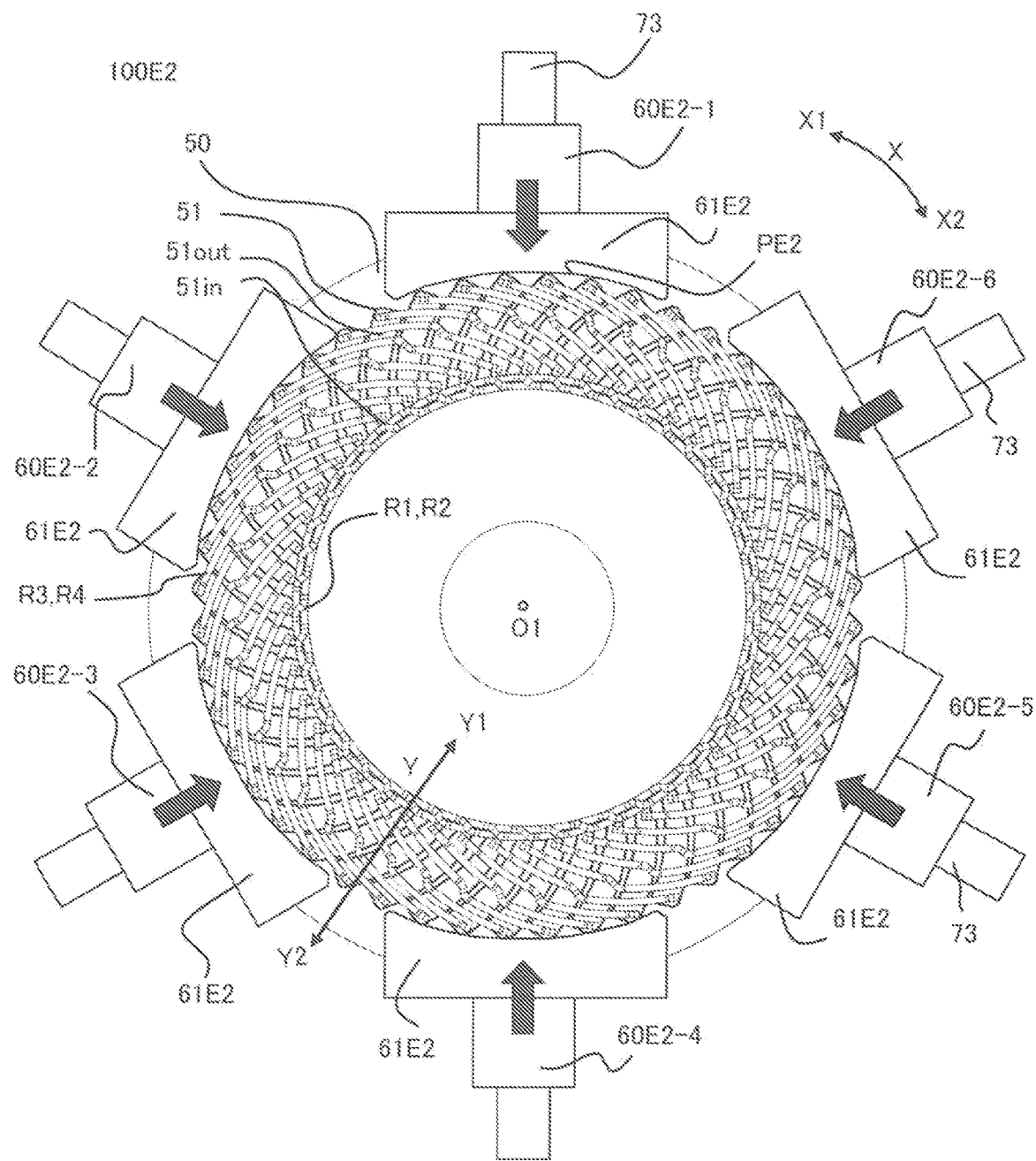
FIG. 20 shows the structure of still another coil alignment device according to the first embodiment and is a plan view of the coil alignment device as seen from the axial-direction upper side.

FIG. 20 shows the structure of the coil alignment device 100E2 of the first embodiment and is a plan view of the coil alignment device 100E2 as seen from the axial-direction upper side Z1.

In the coil alignment device 100E2, six convergence tools 60E2 (60E2-1, 60E2-2, 60E2-3, 60E2-4, 60E2-5, 60E2-6) are radially arranged from the axial point O1 toward the radial-direction outer side Y2.

A press surface PE2 of a pressing portion 61E2 of each convergence tool 60E2 is formed to lave a set curvature so as to fit along the leg portions 2*b* of the segment coils 2 inserted in the guiding portions 51*out* of the guide grooves 51.

Each convergence tool 60E2 has the linear drive portion 73 to linearly move, and thus is linearly movable in the radial direction Y relative to the alignment guide 50.

Further, since the press surface PE2 of each pressing portion 61E2 has a curvature set as described above, the convergence tools 60E2 can function as transfer portions capable of transferring the formed coil assembly 10. Thus, an effect of improving versatility of equipment is also provided.

The convergence tool 60E2 in the coil alignment device 100E2 shown in FIG. 20 is supported by only the aforementioned linear drive portion 73 without using rotational driving. The linear drive portion 73 can be configured by a combination of a servomotor, a cylinder, a linear motion guide, a ball screw, or the like. By applying such a device configuration, it is possible to perform position control for a plurality of convergence tools 60E2 independently of each other.

Thus, while the adjacent segment coils 2 move to the storage portion 51*in* sequentially in the circumferential direction X, at a timing when the slope portions 2c2 of the connection portions 2c overlap each other in the axial direction Z, the segment coils 2 can be pressed. In this way, the segment coils 2 can be converged to such positions that the segment coils 2 do not interfere with each other.

In FIG. 20, the convergence tools 60E2 are driven at a high speed toward the radial-direction inner side YX in the order of 60E2-1, 60E2-2, 60E2-3, 60E2-4, 60E2-5, and then 60E2-6, whereby the plurality of segment coils 2 can be moved to the convergence positions sequentially in the order from the segment coil 2 on the one side X1 in the circumferential direction.

In addition, within a range where the overlapping parts of the connection portions 2c of the segment coils 2 do not interfere, it is possible to operate the plurality of convergence tools 60E2 almost simultaneously.

As a result, convergence time of the segment coils 2 can be shortened and production efficiency is improved.

The coil alignment device of the present embodiment configured as described above is a coil alignment device for forming an annular coil aligned unit by aligning, in an annular shape, a plurality of segment coils each having a pair of leg portions and a connection portion connecting ends of the pair of leg portions, the coil alignment device including: a plate-shaped first jig having a plurality of grooves into which the leg portions of the segment coils are to be inserted and which are arranged at set intervals along a circumferential direction on a first circle located at a first distance from a first point corresponding to a position of a center point of the coil aligned unit such that each groove extends from the first circle toward a radial-direction outer side; and a second jig capable of contacting with the segment coil inserted in the first jig, from a radial-direction side, by reducing a relative distance to the first jig. Each groove includes a storage portion extending along a radial direction so as to have such a first length L1 that allows a plurality of the leg portions to be stored side by side in the radial direction from the first circle, and a guiding portion further extending from the storage portion toward the radial-direction outer side. Here, among the plurality of grooves arranged along the circumferential direction, the groove into which a first leg portion as one of the leg portions of the segment coil is to be inserted is defined as a first groove, and the groove located toward a first-direction side which is one side in the circumferential direction from the first groove is defined as a second groove. The guiding portion of each groove is formed in such a first shape that, using, as a fulcrum, the first leg portion inserted in the storage portion of the first groove, a second leg portion as another of the leg portions inserted in the guiding portion of the second groove is movable toward the storage portion of the second groove. The second jig is movable so as to press at least one of the second leg portion or the connection portion of the segment coil from the radial-direction outer side, thus causing the second leg portion in the guiding portion of the second groove to be stored into the storage portion of the second groove.

As described above, the groove has the storage portion extending along the radial direction so as to have such a first length L1 that allows a plurality of leg portions to be stored side by side in the radial direction from the first circle. Thus, the leg portions of the segment coils converged in each storage portion are arranged side by side along the radial direction. Therefore, the plurality of leg portions of the segment coils converged in the storage portions can be inserted into the slots of the core formed along the radial direction.

The guiding portion of the groove is formed in such a first shape that, using, as a fulcrum, the first leg portion inserted in the storage portion of the first groove, the second leg portion as the other leg portion inserted in the guiding portion of the second groove is movable toward the storage portion of the second groove.

Thus, when the segment coils are pressed from the radial-direction outer side by the second jig, the second leg portion in the guiding portion of the second groove can be moved to be stored into the storage portion of the second groove.

Further, as described above, the storage portion of the guide groove supports one leg portion of the segment coil so that the one leg portion becomes a fulcrum, and also serves as the convergence position where the leg portions of the segment coils are converged. That is, the storage portion has a structure with both of a support and holding function for the one leg portion and a positioning function at the time of convergence.

Therefore, even in a state in which the segment coils to form the first and second layers are converged in the storage portions, the storage portions further support and hold the segment coils to form the third and fourth layers on the radial-direction outer side of the converged segment coils to form the first and second layers, thus further allowing convergence operation.

In this way, it becomes possible to form a coil aligned unit having a desired number of layers by the same device without the need of preparing another device or an additional mechanism and a dedicated jig. Thus, it is possible to provide a coil alignment device having an increased convergence speed while achieving cost reduction, size reduction, and enhancement in production efficiency.

In addition, the tip of the leg portion of each segment coil need not be inserted into a small-diameter hole or the like. Therefore, the process at the time of putting the segment coils can be simplified.

Since the storage portion has such a first length L1 that allows a plurality of leg portions to be stored side by side in the radial direction, it is possible to assuredly form a coil aligned unit having a desired number of layers by adjusting the first length L1.

In the convergence operation for the segment coils, the first jig and the second jig can be configured to perform only rotational driving and linear driving for pressing, without the need of complicated drive mechanisms, whereby the device structure can be simplified. Thus, the cost and the size of the coil alignment device can be further reduced.

In the coil alignment device of the present embodiment configured as described above, the first shape of the guiding portion is made such that, of inner walls on both sides in the circumferential direction of the guiding portion, the inner wall on at least the one side in the circumferential direction is sloped from the radial direction toward a second-direction side which is another side in the circumferential direction.

As described above, of the inner walls on both sides in the circumferential direction of the guiding portion, the inner wall on at least the one side in the circumferential direction is sloped from the radial direction toward the second-direction side which is the other side in the circumferential direction.

Thus, it is possible to ensure such a shape of the guiding portion that the second leg portion inserted in the guiding portion of the second groove can be assuredly moved toward the storage portion of the second groove, using, as a fulcrum, the first leg portion inserted in the storage portion of the first groove.

In the coil alignment device of the present embodiment configured as described above, the storage portion is formed in such a shape that supports the first leg portion inserted in the storage portion so that the first leg portion is rotatable around an axis of the first leg portion.

Since the storage portion is formed in such a shape that supports the leg portion so that the leg portion is rotatable around the axis thereof as described above, it is possible to prevent, for example, twisting of the segment coil by a press force when the segment coil is pressed, whereby a coil aligned unit with high reliability can be formed.

In the coil alignment device of the present embodiment configured as described above, the first shape is made such that the inner wall on at least the one side in the circumferential direction of the guiding portion has such a curvature that, using the first leg portion as a fulcrum, the second leg portion is moved into the storage portion while sliding on the inner wall of the guiding portion.

Since the guiding portion has such a shape that the other leg portion is guided to the storage portion while sliding on the inner wall thereof as described above, it is possible to prevent occurrence of, for example, bending of the segment coil by a press force when the segment coil is pressed, and also, the leg portion can be smoothly guided into the storage portion.

In the coil alignment device of the present embodiment configured as described above, the storage portion is formed in such a shape that the plurality of leg portions stored in the storage portion are allowed to be stored in a corresponding slot of a core of an armature in which the coil aligned unit is used.

Since the storage portion is formed in such a shape that the plurality of leg portions stored in the storage portion are allowed to be stored in the corresponding slot, of the core as described above, the converged leg portions can be assuredly stored in the slots of the core.

In the coil alignment device of the present embodiment configured as described above, the second jig has a press surface capable of pressing at least one of the leg portion or the connection portion of the segment coil from the radial direction, and the press surface is sloped at a set angle with respect to the circumferential direction suchY that the first-direction side of the press surface is located on a radial-direction outermost side.

As described above, the press surface of the second jig is sloped at the set angle with respect to the circumferential direction such that the first-direction side of the press surface is located on the radial-direction outermost side. Thus, when the segment coils are pressed from the radial direction, the segment coil on one side in the radial direction before convergence is prevented from interfering with the second jig or being bitten by the second jig, and the segment coils can be continuously and smoothly guided to the radial-direction inner side, whereby occurrence of convergence failure can be prevented.

The coil alignment method of the present embodiment configured as described above includes: a first insertion step of, in the grooves, inserting one of the leg portions of each segment coil into the storage portion of the corresponding groove, and inserting another of the leg portions into the guiding portion of the corresponding groove different in the circumferential direction; and a first alignment step of, after the first insertion step, while rotating the first jig relative to the second jig toward a second-direction side which is another side in the circumferential direction, pressing at least one of the leg portion or the connection portion of each segment coil from the radial-direction outer side by the second jig, so as to store the other leg portion in each guiding portion into the storage portion sequentially in an order from the segment coil on the first-direction side and bring a plurality of the leg portions into contact with each other in the storage portion of each groove.

In the coil alignment method of the present embodiment configured as described above, execution of the first insertion step and the first alignment step is repeated.

In this way, it becomes possible to provide a coil alignment method for forming a desired number of layers in the same device without the need of preparing another device or an additional mechanism and a dedicated jig. Thus, the convergence speed can be increased and production efficiency can be enhanced.

Second Embodiment

Hereinafter, with reference to the drawings, the second embodiment of the present disclosure will be described focusing on differences from the above first embodiment. The same parts as those in the above first embodiment are denoted by the same reference characters and the description thereof is omitted.

Figure 21:
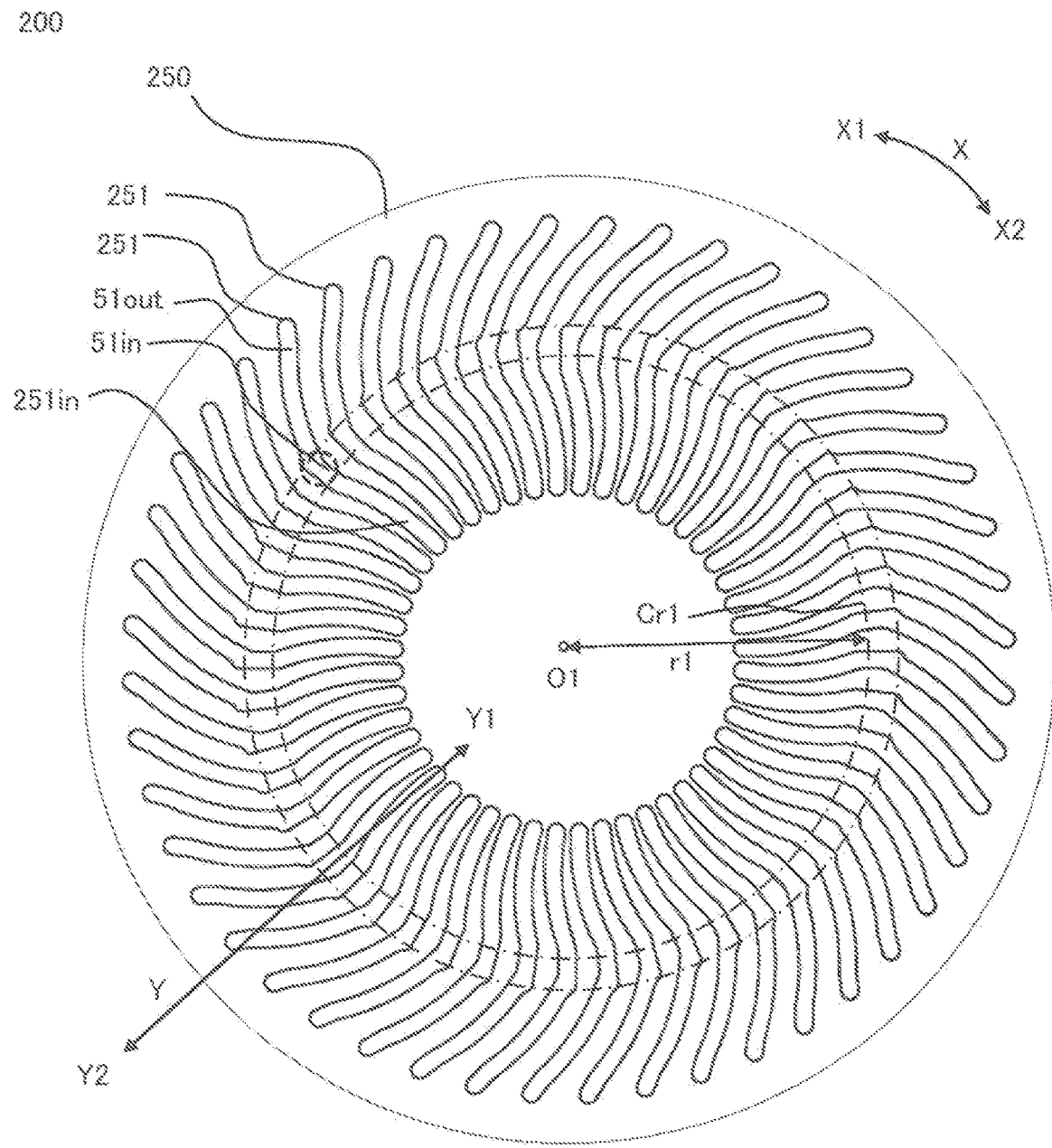
FIG. 21 shows the structure of a coil alignment device according to the second embodiment of the present disclosure and is a plan view of the coil alignment device as seen from the axial-direction upper side.

FIG. 21 shows the structure of a coil alignment device 200 of the second embodiment and is a plan view of the coil alignment device 200 as seen from the axial-direction upper side Z1.

As shown in FIG. 21, an alignment guide 250 of the coil alignment device 200 in the present embodiment has forty-eight guide grooves 251 as grooves into which the leg portions 2a, 2b of the segment coils 2 are to be inserted.

Each guide groove 251 includes the storage portion 51*in* extending in a straight shape along the radial direction Y from the first circle Cr1, and the guiding portion 51out further extending toward the radial-direction outer side Y2 of the alignment guide 250 while sloping toward the other side X2 in the circumferential direction from the storage portion 51*in*.

Further, each guide groove 251 includes an inner-side guiding portion 251*in* extending toward the radial-direction inner side Y1 of the alignment guide 250 while sloping toward the other side X2 in the circumferential direction from the storage portion S1in.

Next, regarding the device structure and operation of the coil alignment device 200 shown in FIG. 21, features and differences from the first embodiment will be described, also using a flowchart in FIG. 22.

Figure 22:
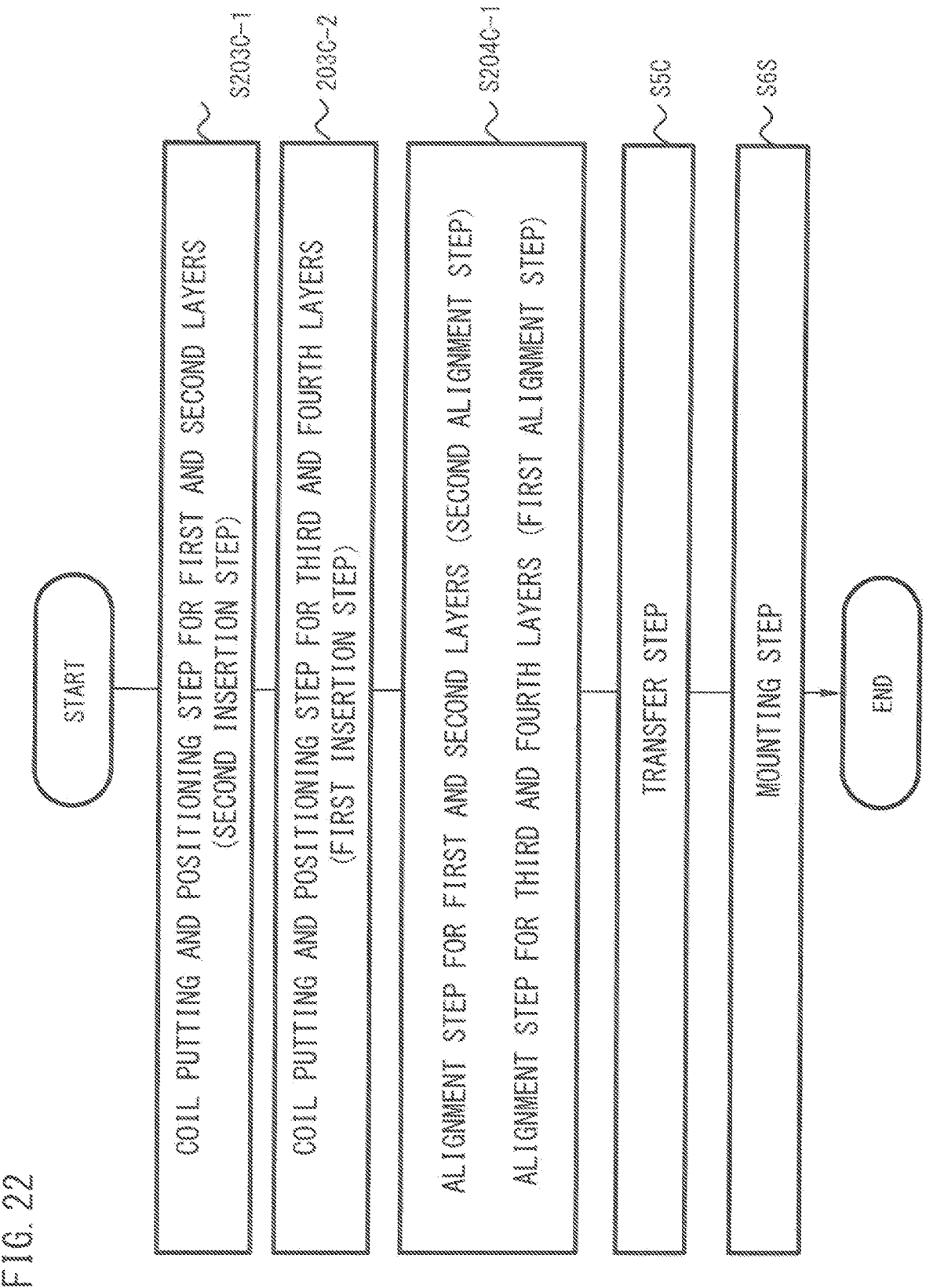
FIG. 22 is a flowchart schematically showing a manufacturing process for a coil assembly by the coil alignment device and the coil alignment method according to the second embodiment.

FIG. 22 is a flowchart schematically showing a manufacturing process for the coil assembly 10 by the coil alignment device 200 and the coil alignment method according to the second embodiment.

Figure 23:
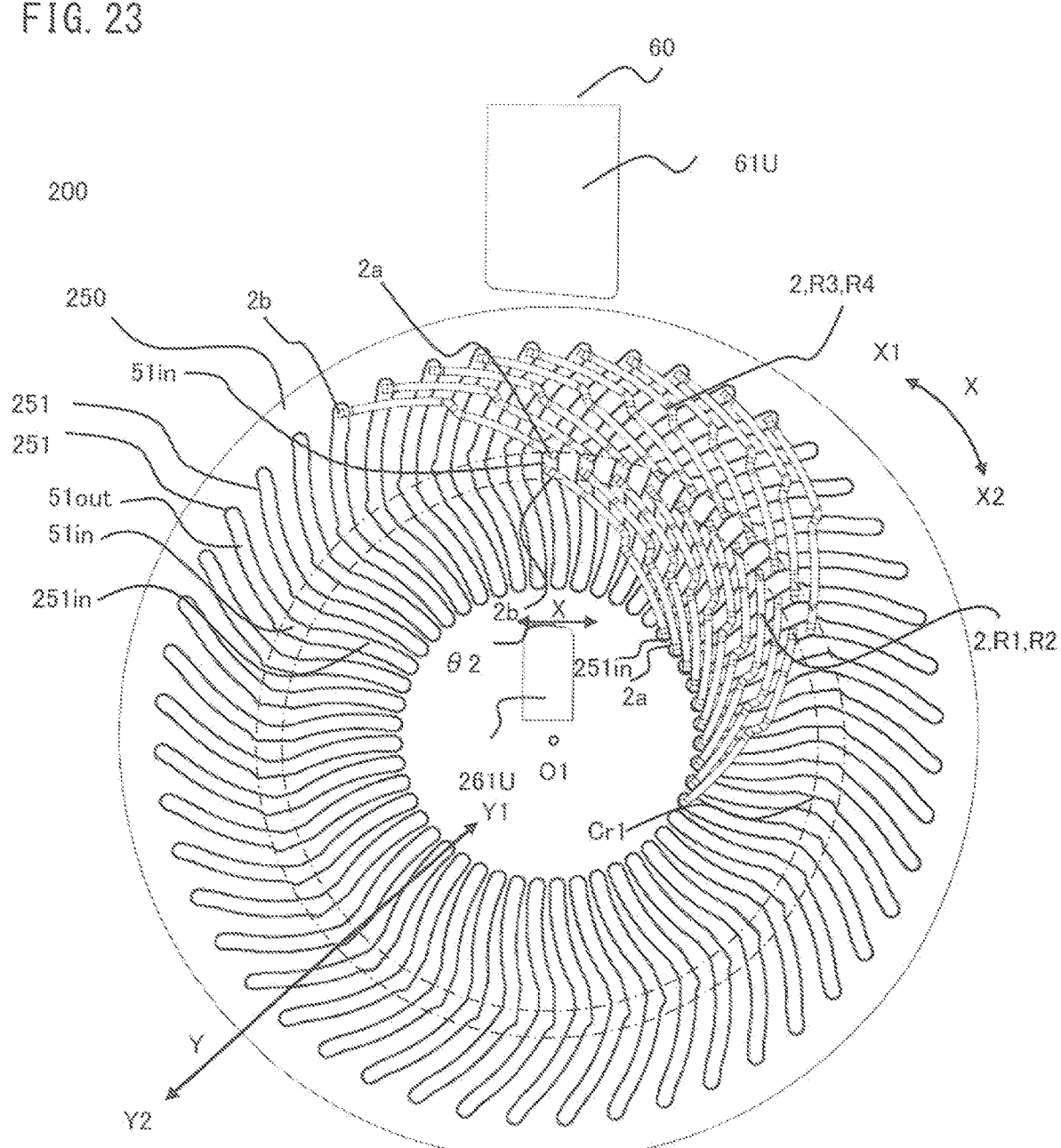
FIG. 23 shows a state in which segment coils to form the first and second layers and the third and fourth layers are inserted in the guide grooves, in the coil alignment device and the coil alignment method according to the second embodiment.

FIG. 23 shows a state in which eight segment coils 2 to form the first and second layers in the slots 1*s* and eight segment coils 2 to form the third and fourth layers in the slots is are inserted in the guide grooves 251, in the coil alignment device 200 and the coil alignment method according to the second embodiment.

Figure 24:
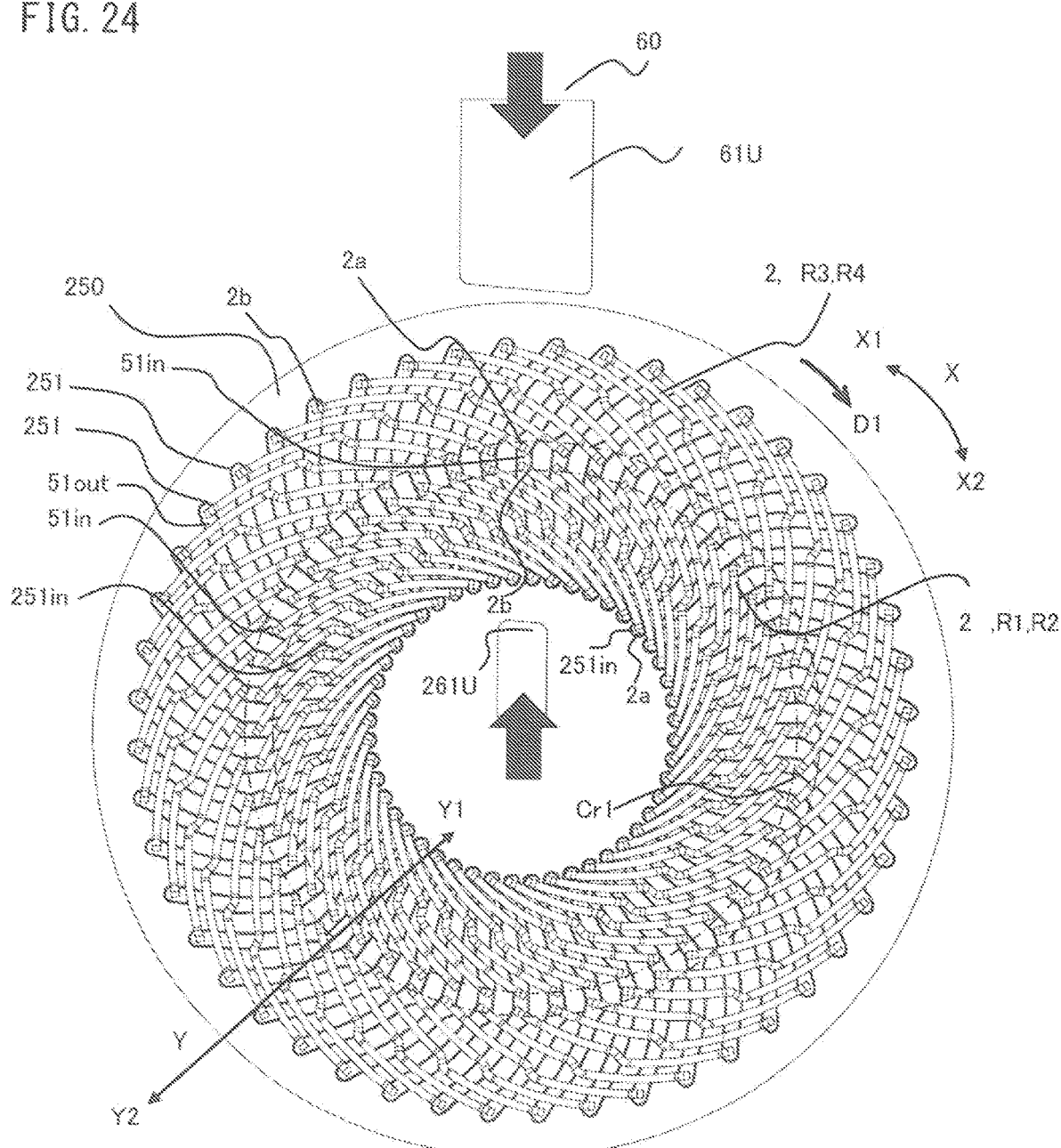
FIG. 24 shows a state in which segment coils to form the first and second layers and the third and fourth layers are inserted in the guide grooves, in the coil alignment device and the coil alignment method according to the second embodiment.

FIG. 24 shows a state in which forty-eight segment coils 2 to form the first and second layers in the slots 1*s* and forty-eight segment coils 2 to form the third and fourth layers in the slots is are inserted in the guide grooves 251, in the coil alignment device 200 and the coil alignment method according to the second embodiment.

Figure 25:
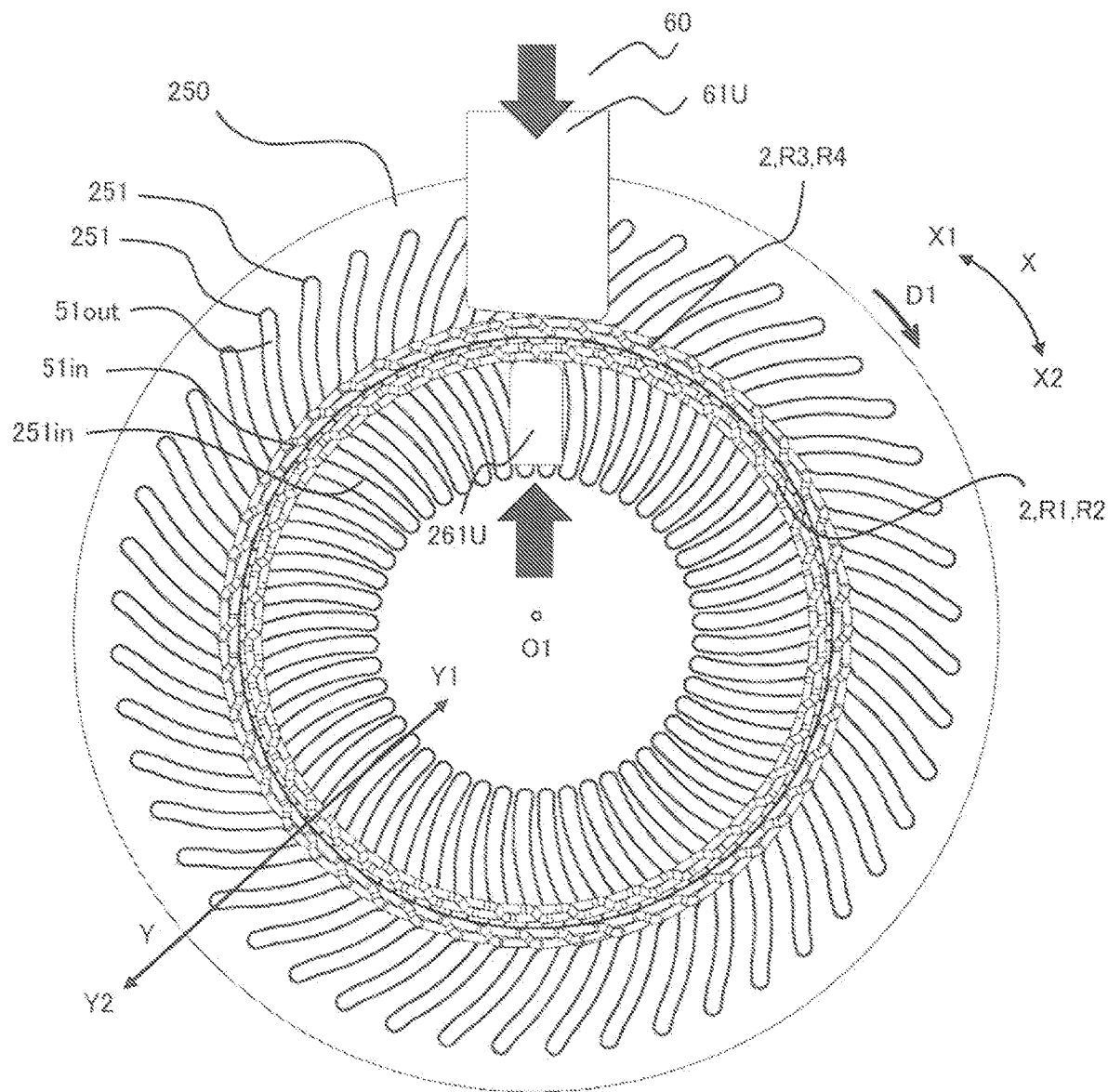
FIG. 25 shows a state in which the segment coils to form the first and second layers and the third and fourth layers are converged in storage portions, in the coil alignment device and the coil alignment method according to the second embodiment.

FIG. 25 shows a state in which the postures of the segment coils 2 to form the first and second layers and the third and fourth layers in the slots is are changed and the segment coils 2 are converged in the storage portions 51in, in the coil alignment device 200 and the coil alignment method according to the second embodiment.

First, in a state in which the leg portions 2a, 2b of each segment coil 2 to form the first and second layers (R1, R2) are opened from each other, the leg portions 2a, 2b of the segment coil 2 are respectively put into the guide grooves 251 from the axial-direction upper side Z1.

At this time, regarding each segment coil 2 to form the first and second layers (R1, R2), one leg portion 2b (third leg portion) of the pair of leg portions 2a, 2b is inserted into the storage portion 51in of the first groove, and the other leg portion 2a (fourth leg portion) is inserted into the inner-side guiding portion 251in of a third groove (different guide groove 251 located on the other side X2 in the circumferential direction) while straddling over a plurality of guide grooves 251.

In this way, as shown in FIG. 24, forty-eight segment coils 2 to form the first and second layers are respectively inserted into forty eight guide grooves 251 (step S203C-1, coil putting and positioning step for first and second layers, second insertion step).

As described above, the step of inserting the pair of leg portions 2a, 2b of each segment coil 2 respectively into the inner-side guiding portion 251in and the storage portion 51in is defined as the second insertion step.

Next, in a state in which the leg portions 2a, 2b of each segment coil 2 to form the third and fourth layers (R3, R4) are opened from each other, the leg portions 2a, 2b of the segment coil 2 are respectively put into the guide grooves 251 from the axial-direction upper side Z1.

At this time, regarding each segment coil 2 to form the third and fourth layers, one leg portion 2a (first leg portion) of the pair of leg portions 2a, 2b is inserted, on the radial-direction outer side Y2 of the leg portion 2b of each segment coil 2 to form the first and second layers, in the storage portion 51in of the first groove.

Meanwhile, the other leg portion 2b (second leg portico) is inserted into the guiding portion 51out of the second groove (different guide groove 251 located on the one side X1 in the circumferential direction) while straddling over a plurality of guide grooves 251 (step C203C-2, coil putting and positioning step for third and fourth layers, first insertion step).

Thus, as shown in FIG. 24, in the forty-eight guide grooves 251, the forty-eight segment coils 2 to form the first and second layers are respectively inserted on the radial-direction inner side Y1 of the forty-eight segment coils 2 to form the third and fourth layers.

Here, the coil alignment device 200 of the second embodiment includes the same upper pressing portion 61U and lower pressing portion 61D as in the first embodiment, for pressing each segment coil 2 positioned by the alignment guide 250 from the radial-direction outer side Y2. Further, the coil alignment device 200 includes an upper pressing portion 261U and a lower pressing portion 261D (which is not shown) for pressing the segment coil 2 from the radial-direction inner side Y1.

Press surfaces 20PU, 20PD on the radial-direction outer side Y2 of the upper pressing portion 261U and the lower pressing portion 261D are sloped at a set angle θ2 with respect to the circumferential direction X such that the other side X2 in the circumferential direction thereof is located on the radial-direction innermost side Y1.

Next, as shown in FIG. 25, while the alignment guide 250 is rotationally driven in the direction of arrow D1, i.e., toward the other side Y2 in the circumferential direction, the upper pressing portion 61U and the lower pressing portion 61D are linearly moved from the radial-direction outer side Y2 toward the radial-direction inner side Y1. Thus, the convergence tool 60 converges the segment coils 2 to form the third and fourth layers, in the storage portions 51in (step S204C-1, first alignment step).

At the same time, the upper pressing portion 261U and the lower pressing portion 261D are linearly moved from the radial-direction inner side Y1 toward the radial-direction outer side Y2.

Thus, regarding each segment coil 2 to form the first and second layers, the other leg portion 2a (fourth lea portion) inserted in the inner-side guiding portion 251in of the third groove moves toward the radial-direction outer side Y2 along the inner wall of the inner-side guiding portion 251in of the third groove, rotationally around the one leg portion 2b (third leg portion) inserted in the storage portion 51in of the first groove, and is stored into the storage portion 51in. Thus, in the storage portion 51in, the leg portions 2a, 2b to form the first and second layers and the third and fourth layers contact with each other (step S204C-1, second alignment step).

As described above, the step of pressing the pair of leg portions 2a, 2b of each segment coil 2 respectively inserted in the inner-side guiding portion 251in and the storage portion 51in from the radial-direction inner side Y1 so as to be aligned is defined as the second alignment step.

Thus, the coil assembly 10 in which the segment coils 2 to form the first and second layers and the third and fourth layers are aligned is formed at the same time in the same device.

As in the first embodiment, the formed coil assembly 10 is mounted to the core 1 through the transfer step SSC and the mounting step S6S, thus forming the stator 20.

In the coil alignment device of the present embodiment configured as described above, each of the plurality of grooves further includes an inner-side guiding portion formed so as to extend from the storage portion toward a radial-direction inner side. Here, among the plurality of grooves arranged along the circumferential direction, the groove located toward the second-direction side from the first groove is defined as a third groove. The inner-side guiding portion of each groove is formed in such a second shape that, using, as a fulcrum, a third leg portion as one of the leg portions of another of the segment coils that is inserted, in the storage portion of the first groove, on the radial-direction inner side of the first leg portion of the segment coil inserted in the storage portion of the first groove, a fourth leg portion as the leg portion of the other segment coil inserted in the inner-side guiding portion of the third groove is movable toward the storage portion of the third groove. The second jig is movable so as to press at least one of the fourth leg portion or the connection portion of the segment coil from the radial-direction inner side, thus causing the fourth leg portion in the inner-side guiding portion of the third groove to be stored into the storage portion of the third groove.

Accordingly, the same effects as in the first embodiment are provided, that is, it becomes possible to form a coil aligned unit having a desired number of layers in the same device without the need of preparing another device or an additional mechanism and a dedicated jig. Thus, it is possible to provide a coil alignment device having an increased convergence speed while achieving cost reduction, size reduction, and enhancement in production efficiency.

Further, the segment coils to form the first and second layers and the segment coils to form the third and fourth layers can be converged at the same time. Thus, the convergence speed can be further increased, whereby a coil alignment device having enhanced production efficiency can be provided.

In the coil alignment device of the present embodiment configured as described above, where the groove located toward the second-direction side from the first groove is defined as a third groove, the inner-side guiding portion of each groove is formed in such a second shape that, using, as a fulcrum, a third leg portion as one of the leg portions of another of the segment coils that is inserted, in the storage portion of the first groove, on the radial-direction inner side of the first leg portion of the segment coil inserted in the storage portion of the first groove, a fourth leg portion as the leg portion of the other segment coil inserted in the inner-side guiding portion of the third groove is movable toward the storage portion of the third groove.

As described above, the inner-side guiding portion also has the above second shape. Thus, the same effects as in the first embodiment are provided, and also when the segment coil is pressed from the radial-direction inner side, the fourth leg portion in the guiding portion of the third groove can be moved so as to be stored into the storage portion of the third groove.

In the coil alignment device of the present embodiment configured as described above, the second shape is made such that the inner wall on at least the one side in the circumferential direction of the inner-side guiding portion has such a curvature that, using the third leg portion as a fulcrum, the fourth leg portion is moved into the storage portion while sliding on the inner wall of the inner-side guiding portion.

Thus, the same effects as in the first embodiment are provided, and since the inner-side guiding portion has such a shape that the other leg portion is guided to the storage portion while sliding on the inner wall thereof, it is possible to prevent occurrence of, for example, bending of the segment coil by a press force when the segment coil is pressed, and also, the leg portion can be smoothly guided into the storage portion.

In the alignment guide shown in FIG. 21, the inner-side guiding portion communicates with the storage portion. However, without limitation thereto, for example, the groove shape may be made such that the storage portion is divided into the segment coil side for forming the first and second layers and the segment coil side for forming the third and fourth layers by a partition or the like. Also in this case, the same convergence operation can be performed and the same effects are provided.

The coil alignment method of the present embodiment configured as described above includes: a second insertion step of, in the grooves, inserting one of the leg portions of each segment coil into the storage portion of the corresponding groove, and inserting another of the leg portions into the inner-side guiding portion of the corresponding groove different in the circumferential direction; and a second alignment step of, after the second insertion step, while rotating the first jig relative to the second jig toward the second-direction side, pressing at least one of the leg portion or the connection portion of each segment coil from the radial-direction inner side by the second jig, so as to store the other leg portion in each inner-side guiding portion into the storage portion sequentially in an order from the segment coil on the first-direction side and bring a plurality of the leg portions into contact with each other in the storage portion of each groove.

Thus, the segment coils to form the innermost layers (first and second layers) can be aligned by being pressed from the radial-direction inner side.

The coil alignment method of the present embodiment configured as described above further includes: a first insertion step of, in the grooves, inserting one of the leg portions of each segment coil into the storage portion of the corresponding groove, and inserting another of the leg portions into the guiding portion of the corresponding groove different in the circumferential direction; and a first alignment step of, after the first insertion step, while rotating the first jig relative to the second jig toward the second-direction side, pressing at least one of the leg portion or the connection portion of each segment coil from the radial-direction outer side by the second jig, so as to store the other leg portion in each guiding portion into the storage portion sequentially in an order from the segment coil on the first-direction side and bring a plurality of the leg portions into contact with each other in the storage portion of each groove. The first alignment step and the second alignment step are performed at the same time.

With the above coil alignment method, the segment coils to form the first and second layers and the segment coils to form the third and fourth layers are converged at the same time, so as to form a desired number of layers. Thus, the convergence speed informing the coil assembly is further increased, whereby production efficiency can be significantly increased.

Although the disclosure is described above in terms of various exemplary embodiments and implementations, it should be understood that the various features, aspects, and functionality described in one or more of the individual embodiments are not limited in their applicability to the particular embodiment with which they are described, but instead can be applied, alone or in various combinations to one or more of the embodiments of the disclosure.

It is therefore understood that numerous modifications which have not been exemplified can be devised without departing from the scope of the present disclosure. For example, at least one of the constituent components may be modified, added, or eliminated. At least one of the constituent components mentioned in at least one of the preferred embodiments may be selected and combined with the constituent components mentioned in another preferred embodiment.

DESCRIPTION OF THE REFERENCE CHARACTERS 1 core
1s slot
2 segment coil
2a, 2b leg portion (first leg portion, second leg portion, third leg portion, fourth leg portion)
2c connection portion
10 coil assembly (coil aligned unit)
20 stator (armature)
51 guide groove (groove, first groove, second groove, third groove)
51in storage portion
51out guiding portion
251in inner-side guiding portion
50 alignment guide (first jig)

60 convergence tool (second jig)
100, 200 coil alignment device
r1 first distance
Cr1 first circle
L1 first length

What is claimed is:

1. A coil alignment device for forming an annular coil aligned unit by aligning, in an annular shape, a plurality of segment coils each having a pair of leg portions and a connection portion connecting ends of the pair of leg portions, the coil alignment device comprising:
a plate-shaped first jig having a plurality of grooves into which the leg portions of the segment coils are to be inserted and which are arranged at set intervals along a circumferential direction on a first circle located at a first distance from a first point corresponding to a position of a center point of the coil aligned unit such that each groove extends from the first circle toward a radial-direction outer side; and
segment coil inserted in the first jig, from a radial-direction side, by reducing a relative distance to the first jig, wherein
each groove includes:
a storage portion extending along a radial direction so as to have such a first length L1 that allows a plurality of the leg portions to be stored side by side in the radial direction from the first circle, and
a guiding portion further extending from the storage portion toward the radial-direction outer side,
where, among the plurality of grooves arranged along the circumferential direction, the groove into which a first leg portion as one of the leg portions of the segment coil is to be inserted is defined as a first groove, and the groove located toward a first-direction side which is one side in the circumferential direction from the first groove is defined as a second groove,
the guiding portion of each groove is formed in such a first shape that, using, as a fulcrum, the first leg portion inserted in the storage portion of the first groove, a second leg portion as another of the leg portions inserted in the guiding portion of the second groove is movable toward the storage portion of the second groove, and
the second jig is movable so as to press at least one of the second leg portion or the connection portion of the segment coil from the radial-direction outer side, thus causing the second leg portion in the guiding portion of the second groove to be stored into the storage portion of the second groove, wherein,
the storage portion is configured such that, among inner walls on both sides in the circumferential direction, at least an inner wall on one circumferential-direction side has the first length L1 and extends linearly from the first circle, and
the first shape of the guiding portion is made such that, of inner walls on both sides in the circumferential direction of the guiding portion, the inner wall on at least the one side in the circumferential direction is sloped from the radial direction toward a second-direction side which is another side in the circumferential direction,
a slope of the first shape of the guiding portion is configured to have a curvature and a length such that, in a state before pressing of each of the segment coils by the second jig, the connection portion of another segment coil, having its first-leg portions inserted into the groove located between the first leg portion and the second leg portion of one segment coil, are disposable within a range of a rotation angle of the second leg portion.

2. The coil alignment device according to claim 1, wherein
the storage portion is formed in such a shape that supports the first leg portion inserted in the storage portion so that the first leg portion is rotatable around an axis of the first leg portion.

3. A coil alignment device for forming an annular coil aligned unit by aligning, in an annular shape, a plurality of segment coils each having a pair of leg portions and a connection portion connecting ends of the pair of leg portions, the coil alignment device comprising:
a plate-shaped first jig having a plurality of grooves into which the leg portions of the segment coils are to be inserted and which are arranged at set intervals along a circumferential direction on a first circle located at a first distance from a first point corresponding to a position of a center point of the coil aligned unit such that each groove extends from the first circle toward a radial-direction outer side; and
a second jig configured to contact the segment coil inserted in the first jig, from a radial-direction side, by reducing a relative distance to the first jig, wherein
each groove includes:
a storage portion extending along a radial direction so as to have such a first length L1 that allows a plurality of the leg portions to be stored side by side in the radial direction from the first circle, and
a guiding portion further extending from the storage portion toward the radial-direction outer side,
where, among the plurality of grooves arranged along the circumferential direction, the groove into which a first leg portion as one of the leg portions of the segment coil is to be inserted is defined as a first groove, and the groove located toward a first-direction side which is one side in the circumferential direction from the first groove is defined as a second groove,
the guiding portion of each groove is formed in such a first shape that, using, as a fulcrum, the first leg portion inserted in the storage portion of the first groove, a second leg portion as another of the leg portions inserted in the guiding portion of the second groove is movable toward the storage portion of the second groove, and
the second jig is movable so as to press at least one of the second leg portion or the connection portion of the segment coil from the radial-direction outer side, thus causing the second leg portion in the guiding portion of the second groove to be stored into the storage portion of the second groove,
wherein
the first shape of the guiding portion is made such that, of inner walls on both sides in the circumferential direction of the guiding portion, the inner wall on at least the one side in the circumferential direction is sloped from the radial direction toward a second-direction side which is another side in the circumferential direction,
each of the plurality of grooves further includes an inner-side guiding portion formed so as to extend from the storage portion toward a radial-direction inner side,
where, among the plurality of grooves arranged along the circumferential direction, the groove located toward the second-direction side from the first groove is defined as a third groove, the inner-side guiding portion of each groove is formed in such a second shape that, using, as a fulcrum, a third leg portion as one of the leg portions of another of the segment coils that is inserted, in the storage portion of the first groove, on the radial-direction inner side of the first leg portion of the segment coil inserted in the storage portion of the first groove, a fourth leg portion as the leg portion of the other segment coil inserted in the inner-side guiding portion of the third groove is movable toward the storage portion of the third groove, and the second jig is movable so as to press at least one of the fourth leg portion or the connection portion of the segment coil from the radial-direction inner side, thus causing the fourth leg portion in the inner-side guiding portion of the third groove to be stored into the storage portion of the third groove.

4. The coil alignment device according to claim 3, wherein the second shape of the inner-side guiding portion is made such that, of inner walls on both sides in the circumferential direction of the inner-side guiding portion, the inner wall on at least the one side in the circumferential direction is sloped toward the second-direction side from the radial direction.

5. The coil alignment device according to claim 1, wherein the first shape is made such that the inner wall on at least the one side in the circumferential direction of the guiding portion has such a curvature that, using the first leg portion as a fulcrum, the second leg portion is moved into the storage portion while sliding on the inner wall of the guiding portion.

6. The coil alignment device according to claim 3, wherein the second shape is made such that the inner wall on at least the one side in the circumferential direction of the inner-side guiding portion has such a curvature that, using the third leg portion as a fulcrum, the fourth leg portion is moved into the storage portion while sliding on the inner wall of the inner-side guiding portion.

7. The coil alignment device according to claim 1, wherein the storage portion is formed in such a shape that the plurality of leg portions stored in the storage portion are allowed to be stored in a corresponding slot of a core of an armature in which the coil aligned unit is used.

8. The coil alignment device according to claim 1, wherein at least one of the first jig or the second jig is rotatable so that the first jig rotates toward the second-direction side relative to the second jig.

9. The coil alignment device according to claim 7, wherein the second jig has a press surface configured to press at least one of the leg portion or the connection portion of the segment coil from the radial direction, and the press surface is sloped at a set angle with respect to the circumferential direction such that the first-direction side of the press surface is located on a radial-direction outermost side.

10. A coil alignment device for forming an annular coil aligned unit by aligning, in an annular shape, a plurality of segment coils each having a pair of leg portions and a connection portion connecting ends of the pair of leg portions, the coil alignment device comprising:

a plate-shaped first jig having a plurality of grooves into which the leg portions of the segment coils are to be inserted and which are arranged at set intervals along a circumferential direction on a first circle located at a first distance from a first point corresponding to a position of a center point of the coil aligned unit such that each groove extends from the first circle toward a radial-direction outer side; and a second jig configured to contact the segment coil inserted in the first jig, from a radial-direction side, by reducing a relative distance to the first jig, wherein each groove includes:

a storage portion extending along a radial direction so as to have such a first length L1 that allows a plurality of the leg portions to be stored side by side in the radial direction from the first circle, and a guiding portion further extending from the storage portion toward the radial-direction outer side, where, among the plurality of grooves arranged along the circumferential direction, the groove into which a first leg portion as one of the leg portions of the segment coil is to be inserted is defined as a first groove, and the groove located toward a first-direction side which is one side in the circumferential direction from the first groove is defined as a second groove, the guiding portion of each groove is formed in such a first shape that, using, as a fulcrum, the first leg portion inserted in the storage portion of the first groove, a second leg portion as another of the leg portions inserted in the guiding portion of the second groove is movable toward the storage portion of the second groove, and the second jig is movable so as to press at least one of the second leg portion or the connection portion of the segment coil from the radial-direction outer side, thus causing the second leg portion in the guiding portion of the second groove to be stored into the storage portion of the second groove, wherein the first shape of the guiding portion is made such that, of inner walls on both sides in the circumferential direction of the guiding portion, the inner wall on at least the one side in the circumferential direction is sloped from the radial direction toward a second-direction side which is another side in the circumferential direction, the storage portion is formed in such a shape that supports the first leg portion inserted in the storage portion so that the first leg portion is rotatable around an axis of the first leg portion, each of the plurality of grooves further includes an inner-side guiding portion formed so as to extend from the storage portion toward a radial-direction inner side, where, among the plurality of grooves arranged along the circumferential direction, the groove located toward the second-direction side from the first groove is defined as a third groove, the inner-side guiding portion of each groove is formed in such a second shape that, using, as a fulcrum, a third leg portion as one of the leg portions of another of the segment coils that is inserted, in the storage portion of the first groove, on the radial-direction inner side of the first leg portion of the segment coil inserted in the storage portion of the first groove, a fourth leg portion as the leg portion of the other segment coil inserted in the inner-side guiding portion of the third groove is movable toward the storage portion of the third groove, and the second jig is movable so as to press at least one of the fourth leg portion or the connection portion of the segment coil from the radial-direction inner side, thus causing the fourth leg portion in the inner-side guiding portion of the third groove to be stored into the storage portion of the third groove.

11. The coil alignment device according to claim 10, wherein
the second shape of the inner-side guiding portion is made such that, of inner walls on both sides in the circumferential direction of the inner-side guiding portion, the inner wall on at least the one side in the circumferential direction is sloped toward the second-direction side from the radial direction.

12. The coil alignment device according to claim 2, wherein
the first shape is made such that the inner wall on at least the one side in the circumferential direction of the guiding portion has such a curvature that, using the first leg portion as a fulcrum, the second leg portion is moved into the storage portion while sliding on the inner wall of the guiding portion.

13. The coil alignment device according to claim 3, wherein
the first shape is made such that the inner wall on at least the one side in the circumferential direction of the guiding portion has such a curvature that, using the first leg portion as a fulcrum, the second leg portion is moved into the storage portion while sliding on the inner wall of the guiding portion.

14. The coil alignment device according to claim 4, wherein
the first shape is made such that the inner wall on at least the one side in the circumferential direction of the guiding portion has such a curvature that, using the first leg portion as a fulcrum, the second leg portion is moved into the storage portion while sliding on the inner wall of the guiding portion.

15. The coil alignment device according to claim 10, wherein
the first shape is made such that the inner wall on at least the one side in the circumferential direction of the guiding portion has such a curvature that, using the first leg portion as a fulcrum, the second leg portion is moved into the storage portion while sliding on the inner wall of the guiding portion.

16. A coil alignment method using the coil alignment device according to claim 1, comprising:
a first insertion step of, in the grooves, inserting one of the leg portions of each segment coil into the storage portion of the corresponding groove, and inserting another of the leg portions into the guiding portion of the corresponding groove different in the circumferential direction; and
a first alignment step of, after the first insertion step, while rotating the first jig relative to the second jig toward a second-direction side which is another side in the circumferential direction, pressing at least one of the leg portion or the connection portion of each segment coil from the radial-direction outer side by the second jig, so as to store the other leg portion in each guiding portion into the storage portion sequentially in an order from the segment coil on the first-direction side and bring a plurality of the leg portions into contact with each other in the storage portion of each groove.

17. The coil alignment method according to claim 16, wherein
execution of the first insertion step and the first alignment step is repeated.

18. A coil alignment method using the coil alignment device according to claim 3, comprising:
a second insertion step of, in the grooves, inserting one of the leg portions of each segment coil into the storage portion of the corresponding groove, and inserting another of the leg portions into the inner-side guiding portion of the corresponding groove different in the circumferential direction; and
a second alignment step of, after the second insertion step, while rotating the first jig relative to the second jig toward the second-direction side, pressing at least one of the leg portion or the connection portion of each segment coil from the radial-direction inner side by the second jig, so as to store the other leg portion in each inner-side guiding portion into the storage portion sequentially in an order from the segment coil on the first-direction side and bring a plurality of the leg portions into contact with each other in the storage portion of each groove.

19. The coil alignment method according to claim 18, further comprising:
a first insertion step of, in the grooves, inserting one of the leg portions of each segment coil into the storage portion of the corresponding groove, and inserting another of the leg portions into the guiding portion of the corresponding groove different in the circumferential direction; and
a first alignment step of, after the first insertion step, while rotating the first jig relative to the second jig toward the second-direction side, pressing at least one of the leg portion or the connection portion of each segment coil from the radial-direction outer side by the second jig, so as to store the other leg portion in each guiding portion into the storage portion sequentially in an order from the segment coil on the first-direction side and bring a plurality of the leg portions into contact with each other in the storage portion of each groove, wherein
the first alignment step and the second alignment step are performed at the same time.

20. A coil alignment device for forming an annular coil aligned unit by aligning, in an annular shape, a plurality of segment coils each having a pair of leg portions and a connection portion connecting ends of the pair of leg portions, the coil alignment device comprising:
a plate-shaped first jig having a plurality of grooves into which the leg portions of the segment coils are to be inserted and which are arranged at set intervals along a circumferential direction on a first circle located at a first distance from a first point corresponding to a position of a center point of the coil aligned unit such that each groove extends from the first circle toward a radial-direction outer side; and
a second jig configured to contact the segment coil inserted in the first jig, from a radial-direction side, by reducing a relative distance to the first jig, wherein
each groove includes:
a storage portion extending along a radial direction so as to have such a first length L1 that allows a plurality of the leg portions to be stored side by side in the radial direction from the first circle, and
a guiding portion further extending from the storage portion toward the radial-direction outer side,
where, among the plurality of grooves arranged along the circumferential direction, the groove into which a first leg portion as one of the leg portions of the segment coil is to be inserted is defined as a first groove, and the groove located toward a first-direction side which is one side in the circumferential direction from the first groove is defined as a second groove, the guiding portion of each groove is formed in such a first shape that, using, as a fulcrum, the first leg portion inserted in the storage portion of the first groove, a second leg portion as another of the leg portions inserted in the guiding portion of the second groove is movable toward the storage portion of the second groove, and the second jig configured to be movable so as to press at least one of the second leg portion or the connection portion of the segment coil from the radial-direction outer side while there is relative movement between the plate-shaped first jig and the second jig in a circumferential direction along the first circle, thus causing the second leg portion in the guiding portion of the second groove to be stored into the storage portion of the second groove.

* * * * *